(12) United States Patent
Choi et al.

(10) Patent No.: US 6,836,039 B2
(45) Date of Patent: Dec. 28, 2004

(54) BRUSHLESS VIBRATION MOTOR

(75) Inventors: Tae Young Choi, Yongin-shi (KR); Soon Do Kweon, Seoul (KR); Hwa Young Oh, Suwon-shi (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/603,473

(22) Filed: Jun. 24, 2003

(65) Prior Publication Data

US 2004/0135444 A1 Jul. 15, 2004

(30) Foreign Application Priority Data

Dec. 30, 2002 (KR) .................................. 10-2002-86688

(51) Int. Cl.$^7$ ................................................ H02K 7/06
(52) U.S. Cl. ...................................................... 310/81
(58) Field of Search ........................ 310/81, 268, 68 R

(56) References Cited

U.S. PATENT DOCUMENTS

| | | | | |
|---|---|---|---|---|
| 4,704,566 A | * | 11/1987 | Hirano et al. ............... | 318/254 |
| 4,724,350 A | * | 2/1988 | Shiraki et al. ............... | 310/268 |
| 4,728,833 A | * | 3/1988 | Shiraki et al. ............. | 310/68 R |
| 4,733,119 A | * | 3/1988 | Shiraki et al. ............... | 310/268 |
| 4,757,222 A | * | 7/1988 | Shiraki et al. ............ | 310/68 B |
| 4,973,869 A | * | 11/1990 | Cho ......................... | 310/68 B |
| 4,980,590 A | * | 12/1990 | Taniguchi et al. ............ | 310/81 |
| 6,462,441 B1 | * | 10/2002 | Horng et al. ............. | 310/67 R |

* cited by examiner

Primary Examiner—Dang Le
Assistant Examiner—Nguyen Hanh
(74) Attorney, Agent, or Firm—Darby & Darby

(57) ABSTRACT

A brushless vibration motor includes a base plate unit having a burring element extended from the base plate, and including a shaft having a first portion inserted into the burring element to be fixedly coupled to the base plate, a stator having at least one coil disposed on the base plate through which current flows, a rotor rotatably supported by a second portion of the shaft, and having a bearing slidably inserted around the second portion of the shaft, a bearing holder having an inside surface forcibly coupled to the bearing, and a yoke coupled to the bearing holder and having a magnet mounted on the yoke to be spaced-apart from the coils to generate a magnetic field with the coil, and a counterweight generating eccentricity, and a cover coupled to the base plate to enclose the stator and the rotor.

43 Claims, 11 Drawing Sheets

-▲- coil torque  -✕- cogging torque  -●- total torque

BRUSHLESS VIBRATION MOTOR

CROSS-REFERENCE TO RELATED APPLICATION

This application claims to benefit of Korean Patent Application No. 2002-12004, filed Month day, 2002, in the Korean Intellectual Property Office, the disclosure of which is incorporated herein by reference.

BACKGROUND OF THE INVENTION

1. Field of the Invention

The present invention relates to a brushless vibration motor generating a receiving or alarm signal in a mobile telecommunication unit, such as a wireless phone, and more particularly, to a brushless vibration motor being capable of improving durability, vibration characteristics, a load reduction, and rotation characteristics using an improved shaft structure and a rotor assembling structure.

2. Description of the Related Art

According to a rapid development of digital technology, various types of wire or wireless telecommunication machines have been developed and widely used. Developments of wire or wireless telecommunication technologies provides machines facilitates transmission of huge amount of various information data in a very short period of time, thereby enabling the users to transmit and receive desirable information data regardless of a location and time. A wide and rapid transmission flow of the information data forms a global town with a development of transportation.

One of the wireless telecommunication machines is a personal mobile telecommunication terminal, such as a cellular phone or a personal communication system PCS. The cellular phone is one of digital or analog short wave transmission types connecting a mobile telephone to a transmitter/receiver of which service area is called a cell.

Although the PCS is the same wireless service system as the cellular phone, the PCS provides mobility for personal use. The PCS is also called to a digital cellular phone for a mobile user and requires a great number of antennas covering various service areas. A closest antenna is supposed to be used to receive/transmit a signal from/to the PCS and transmit the signal to a wireless network station.

A cellular system operates in a frequency band ranging 824–849 MHz, and the PCS operates in a frequency band ranging 1850–1990 MHz. Since the PCS has a data transmission rate of 8–13 Kbps, a high speed data transmission is almost impossible. According to the development of digital telecommunication technologies, a more high speed transmission of data packet, video, multimedia enables a personal telecommunication to receive various services, such as a voice telephone, telex, wireless calling, electronic mail, etc.

In accordance with the development of the telecommunication technologies and parts, integration and miniaturization of electronic products, and multifunctional system, telecommunication terminals employs various types of equipment, such as a digital camera transmitting a digital image, an audio unit generating a receiving call with a high quality and a multiple channel, a display device displaying an image using a high resolution, a wide viewing angle, and a high response time.

An alarm is realized in a bell sound mode or a vibration mode to generate the calling signal of a received call, a received electronic mail, and a predetermining time. Bell sound of the bell sound mode is stored in the mobile telecommunication terminal in a manufacturing process or downloaded through Internet connected to the telecommunication terminal. The vibration mode is performed using a vibration motor having a rotor. The vibration motor currently used in a mobile telecommunication terminal is one of a brush vibration motor and a brushless vibration motor or one of a bar type vibration motor and a coin type vibration motor.

A conventional brush vibration motor having a coil type used in the mobile telecommunication terminal is shown in FIG. 1. A structure and an operation of the conventional brush vibration motor is described hereinafter, and then a conventional brushless vibration motor removing problems occurring in the conventional brush vibration motor will be described later.

FIG. 1 is a cross-sectional view of a brush-type vibration motor, FIG. 2 is an exploded view of the brush-type vibration motor shown in FIG. 1, and FIGS. 3A and 3B are a plan view showing an arrangement of a coil and a commutator contacting a brush of the brush-type vibration motor shown in FIGS. 1 and 2.

As shown in FIGS. 1 and 2, a bracket 1 having a fixed plate (base plate) is formed with a burring element (not indicated with a reference numeral) extended upward from a center portion of the bracket 1, and a shaft 5 includes a first end inserted into the burring in a vertical direction and fixedly coupled to the bracket 1 using a washer. A flexible printed circuit board (FPCB) 2 is mounted in an upper surface of the bracket 1, and a predetermined circuit and a terminal unit are formed on the FPCB2.

A magnet 3 having a ring—shape is mounted on an upper surface of the FPCB2 of the bracket 1 around a shaft 5. The magnet 3 includes a plurality of magnet poles having one of N and S polarities. A brush 4 is connected to the FPCB2 at one end and contacts one of segments of a commutator of a rotor 10 at the other end which is disposed above an upper surface of the magnet 3.

The rotor 10 is rotatably disposed around the shaft 5. The rotor 10 includes a counterweight 13 generating eccentricity for vibration of the motor, coils 12 through which alternative current flows, a bearing reducing friction between the shaft 5 and the rotor 11, and a resin formed in a single body insertion injected method as an insulation material.

The counterweight 13 is mounted on a portion of the rotor 10 to generate the eccentricity and the coils 12 is disposed on the rotor 10 in a circular direction of the shaft 5 to generate a magnetic field upon receipt of the alternative current from the commutator. The rotor 10 includes the bearing inserted around the shaft 5 and is formed in a monolithic body by filling the space with the resin as the insulation material.

A shape of the rotor 10 varies according to a desirable vibration type in the vibration motor. The number of the coils 12 is also variable as well as an arrangement of the coils 12 according to a motor driving method. If the arrangement of the coils 12 and the magnetic poles of the magnet 3 are changed, a rotation electromagnetic force occurring due to the magnetic field generated between the coils 12 and the magnet 3 is changed, and accordingly, a torque and a rotation speed of the rotor 10 are changed. In a three phase driving methods. The number of the coils is a multiple of 3.

A printed circuit board 14 is mounted on a bottom surface of the rotor 10, and the commutator having the segments is mounted on the printed circuit board 14 to supply the current to the coils 12. When the rotor 10 rotates, respective segments of the commutator contact the brush 4 according to a rotation position of the commutator corresponding to the brush.

A cover 20 having a cap shape and an inner portion fixedly supporting a distal end of the shaft 5 is connected to a circumference of the bracket 1 to enclose the rotor 10 and the magnet 3.

An operation of the brush vibration motor having the above structure is explained hereinafter. The current flows through the brush 4 and the coils through the segments of the commutator contacting the brush 4. The coils 12 are excited upon receipt of the current, and the magnetic field is generated in the coils 12 through which the current flows according to Fleming's rule. The rotation electromagnetic force is generated when the magnetic force of the coils 12 is offset with another magnetic field generated from the magnet 3 having the magnetic poles.

The rotor 10 starts to rotate in accordance with the rotation electromagnetic force generated between the coils 12 and the magnet 3. When the brush 4 contacts different segments of the commutator, the coils 12 are turned on an off, and accordingly a change of the rotation electromagnetic force maintain the rotor rotating.

Since the rotor 10 eccentrically rotates due to the existence of the counterweight 13, a predetermined vibration is generated to make the wireless phone unbalanced (vibrated), and accordingly, the user of the wireless phone acknowledges he receiving call.

The above brush vibration motor is disadvantageous since durability of a mechanical contact between the commutator and the brush deteriorates, and an assembling problem in a manufacturing process occurs. That is when friction occurs between the brush and the commutator, metal power or lead power is scattered, and a lifespan of the motor becomes shortened. Moreover, due to arc generated from a point contact in a warn-out portion of the brush and the commutator, a flash over phenomenon may occur, and fire may be set in the motor.

In an effort to solve the above problems, a brushless vibration motor has been developed and is currently in widespread use. In the brushless vibration motor, the mechanical contact between the commutator and the brush is replaced with an integrated circuit, e.g., a semiconductor I.C., to perform an electronic and non-contacting rectifying process.

The non-contacting rectifying process can be obtained through a magnetic or optical method. Generally, since the rotor is formed with a permanent magnet, a hall element is used to detect a position of the rotor using the magnetic field generated from the rotor. Thus, it is not necessary to provide any additional parts generating a specific magnetic field.

When a structure of the motor becomes simplified, noise is not generated and durability and an assembling process are improved. The brushless motor, however, may be not advantageous in a manufacturing cost since an electronic parts driving and controlling a motor should be installed in the motor.

That is, the conventional brushless vibration motor is advantageous in a high precision and a high reliability, but disadvantageous since the electronic parts are additionally needed, and the manufacturing cost increases.

The conventional brushless motor may have other problems in an assembled structure of the rotor. In the conventional brushless motor, the rotor is formed with the coils the counterweight, and the bearing contacting the shaft with friction by using a bonding process. Thus, the assembled structure of the rotor cannot be secured in axial and radial directions of the shaft.

Accordingly, strength and durability of the motor is weakened, the motor is susceptible to an external impact. Due to an unstable rotation of the motor during an eccentric rotation, vibration sound may be not generated uniformly to notify a user of the receiving all. A maintenance cost for repair or replacement of respective parts increases.

Since the rotor of the brushless vibration motor is manufactured by the insertion injection method, the manufacturing cost increases. Due to a weight an injection molding material filled in the coils, desirable characteristics of the rotation electromagnetic force and stable rotational movement cannot be obtained, and the problems of wear and tear between the brush and the commutator still exist.

The conventional brushless motor may lacks compatibility between wireless phones when driving methods of the vibration motor are not the same but different from each other.

The electronic parts of the motor should be replaced with another one according to the driving method of the motor. In the conventional wireless phone, the electronic parts controlling the motor are separately mounted on the wireless phone from the motor. Accordingly, when the motor is replaced, the electronic part should be replaced as well according to the driving method of the motor, thereby lowering the compatibility and reducing an efficiency of the motor in view of a manufacturer and the wireless phone user.

Therefore, in order to solve the problem that the electronic parts are replaced in accordance with the driving method of the motor, technologies for mounting the electronic parts in an inside of the motor are developed.

However, the coils forming a stator is not mounted on the same area as the bracket plate but a separate area different from the area of the fixed plate. Since an empty space on the bracket other than the area in which the coils are mounted, cannot be used, a size and a diameter of the bracket increase.

When the electronic parts are mounted on a lower surface of the bracket, a height of the motor may increase, and the motor cannot be minimized.

Another disadvantage in the conventional brushless vibration motor is a non-motive point at which a uniform torque to rotate the rotor does not generate from the coils and the magnet, thereby preventing the rotor from rotating.

At the non-motive point, a center of the magnetic polarity of the magnet becomes identical to that of the coil, and the torque becomes zero. In the three phases driving method, all torque generated from respective phases are added so as not to be zero. Thus, a total torque does not become zero, and there does not exist the non-motive point.

However, the three phase driving method includes a complicated driving circuits compared to the mono phase driving method. The size of the motor becomes large, and the manufacturing cost increases. Therefore, it is necessary to eliminate the non-motive point in the mono phase driving method and reduce the manufacturing cost of the brushless vibration motor.

It is desirable to improve the assembled structure of the rotor and generate on effective vibration while maintaining liability and reliability vibration motor. It is also desirable to improve minimization and compatibility of the motor and remove the non-motive point from the motor using the mono phase driving method. In addition to the improvement on the assembled structure of the rotor, a structure of the shaft disposed at a rotational center of the rotor needs to be improved to provide a stable rotation of the rotor, a load and a power consumption are needed to be reduced while rotational characteristics of the motor are improved.

SUMMARY OF THE INVENTION

To solve the above and/or other problems, it is an aspect to provide a brushless vibration motor generating a stable vibration and improving durability using an improved assembling structure of a rotor eccentrically rotating in the brushless vibration motor.

It is another aspect of the invention to provide a brushless vibration motor compatible with mobile telecommunication machines having different type of vibration methods of a vibration motor, reducing a manufacturing cost in integrally assembling electrical driving parts of the brushless vibration motor, and improving an assembling structure of a rotor.

It is another aspect of the invention to provide a brushless vibration motor having a cogging generating unit preventing a non-motive point occurring when the brushless vibration motor is a mono phase type, by reducing an assembling structure of a rotor.

Additional aspects and advantages of the invention will be set forth in part in the description which follows and, in part, will be obvious from the description, or may be learned by practice of the invention.

To achieve the above and/or other aspects, a brushless vibration motor includes a base plate unit having a burring element extended from the base plate and a shaft having a first portion inserted into the burring element to be fixedly coupled to the base plate, a stator having at least one coil disposed on the base plate through which current flows, a rotor rotatably supported by a second portion of the shaft and having a bearing slidably inserted around the second portion of the shaft, a bearing holder having an inside surface forcibly coupled to the bearing, and a yoke coupled to the bearing holder and having a magnet mounted on the yoke to be spaced-apart from the coils to generate a magnetic field with the coil, and a counterweight generating eccentricity, and a cover coupled to the base plate to enclose the stator and the rotor.

According to another aspect to the present invention, the bearing holder forms a space with the bearing forcibly inserted into the bearing holder, and the rotor includes a thrust washer inserted into the space and supported by the second portion of the shaft.

According to another aspect to the present invention, the second end of the shaft includes a distal end formed on the second portion and having a curvature to come into point-contact with the thrust washer to support the thrust washer.

According to another aspect to the present invention, the rotor includes a wall defining the space and a hole formed on the wall through which the space communicate with an outside of the bearing holder.

According to another aspect to the present invention, the yoke is formed of a soft magnetic material.

According to another aspect to the present invention, the bearing holder includes a cap shape having an opening open to the base plate, another inside surface forming a space with the bearing, and a thrust washer inserted into the space and supported by a round end of the second portion of the shaft, and the yoke includes a first yoke forcibly inserted around an outside surface of the bearing holder, and having the counterweight formed on a portion of the upper yoke, and a second yoke forcibly inserted around the outside surface of the bearing holder, and having a ring type magnet.

According to another aspect to the present invention, the second yoke is formed of a soft magnetic material.

According to another aspect to the present invention, the bearing holder includes a cap shape having an opening open to the base plate, another inside surface forming a space with the bearing, and a thrust washer inserted into the space and supported by a round end of the second portion of the shaft, and the yoke is forcibly inserted around an outside surface of the bearing holder to be fixedly coupled to the bearing holder and includes a first portion limiting a movement of the counterweight with the bearing holder in an axial direction and in a radial direction of the shaft, and a second portion mounted with the magnet having a ring type.

According to another aspect to the present invention, the bearing holder includes a cap shape having an opening open to the base plate, another inside surface forming a space with the bearing, and a thrust washer inserted into the space and supported by a round end of the second portion of the shaft, and the yoke includes a first yoke forcibly inserted around an outside surface of the bearing holder and formed asymmetrically with respect to the shaft to eccentrically rotate the rotor, and a second yoke forcibly inserted around the outside surface of the bearing holder and formed with the magnet having a ring type.

According to another aspect to the present invention, the second yoke is formed of a soft magnetic material.

According to another aspect to the present invention, the first yoke is formed of a metal having a specific gravity of less than 10.

According to another aspect to the present invention, the bearing holder comprises a cap shape having an opening open to the base plate, the yoke is coupled to an upper surface of the bearing holder, the magnet is a ring-type disposed on the yoke, and the counterweight is disposed on the yoke.

According to another aspect to the present invention, the yoke forms a space with the bearing holder, and the rotor includes a hole formed on a portion of the bearing holder to communicate with the space and an outside of the bearing holder, and a thrust washer having one portion inserted into the hole and the other portion disposed in the space between the portion of the bearing holder and the shaft to be supported by a curved end of the second portion of the shaft.

According to another aspect to the present invention, the rotor includes an air circulation hole formed on one of the bearing holder and the thrust washer and communicating with a space surrounded by the bearing, the thrust washer, and the shaft.

According to another aspect to the present invention, the yoke includes a circumference bent toward the base plate, the magnet includes an inner surface supported by an outer surface of the bearing holder and disposed on the yoke, and the counterweight includes a protrusion having a step shape in an radial direction of the shaft and disposed between an outer circumferential surface of the magnet and an inside surface of the circumference of the yoke.

According to another aspect to the present invention, the motor is a mono phase drive type having a non-motive point, and the rotor includes a cogging torque generating unit disposed on one of the base plate and the cover to prevent the non-motive point.

According to another aspect to the present invention, the magnet includes a plurality of magnetic poles having a first angle with respect to the shaft, the coil includes a center line extended from the shaft, and the cogging torque generating unit is disposed on a line forming a second angle of a quarter of the first angle of the coil with respect to the center line of the coil.

According to another aspect to the present invention, the magnet includes 6 magnetic poles, the coil comprises a center line extended from the shaft, and the cogging torque generating unit is disposed on a line having an angle of 15 degrees with respect to the center line of the coil.

According to another aspect to the present invention, the magnet includes 6 magnetic poles, the coil comprises sub-coils each having a center line extended from the shaft, and the cogging torque generating unit includes sub-cogging torque generating units each disposed on a line having an angle of 15 degrees with respect to corresponding center line of the sub-coils.

To achieve the above and/or other objects, a brushless vibration motor includes a base plate unit having a burring element extended from the base plate and a shaft having a first portion inserted into the burring element to be fixedly coupled to the base plate, a stator having at least one coil disposed on a first area of the base plate through which current flows, a rotor rotatably supported by a second portion of the shaft and having a bearing slidably inserted around the second portion of the shaft, a bearing holder having an inside surface forcibly coupled to the bearing, and a yoke coupled to the bearing holder and having a magnet mounted on the yoke to be spaced-apart from the coils to generate a magnetic field with the coil, and a counterweight generating eccentricity, a motor drive IC disposed on a second area of the base plate to face the rotor and to control the current flowing through the coil, and a cover coupled to the base plate to enclose the stator, the rotor, and the motor drive IC.

According to another aspect to the present invention, the stator includes a hall element formed in the motor drive IC in a single body to detect polarity of the magnet.

According to another aspect to the present invention, the base plate includes a first side facing the rotor and a second side disposed opposite to the first side, and the stator includes a printed circuit board disposed on the first side of the base plate and mounted with the coil and the motor drive IC.

According to another aspect to the present invention, the base plate includes a terminal unit formed on one of the first and second sides of the base plate, coupled to the printed circuit board, and coupled to an external source to receive the current.

According to another aspect to the present invention, the stator includes another printed circuit board disposed on one of the first and second sides of the base plate, coupled to an external source to receive the current, and coupled to the printed circuit board having the coil and the motor drive IC.

According to another aspect to the present invention, the base plate includes one of a single printed circuit board and a double-sided printed circuit board.

According to another aspect to the present invention, the bearing holder forms a space with the bearing forcibly inserted into the bearing holder, and the rotor includes a thrust washer inserted into the space and supported by the second portion of the shaft.

According to another aspect to the present invention, the second end of the shaft includes a distal end formed on the second portion and having a curvature to come into point-contact with the thrust washer to support the thrust washer.

According to another aspect to the present invention, the rotor includes a wall defining the space, and a hole formed on the wall through which the space communicate with an outside of the bearing holder.

According to another aspect to the present invention, the yoke is formed of a soft magnetic material.

According to another aspect to the present invention, the bearing holder includes a cap shape having an opening open to the base plate, another inside surface forming a space with the bearing, and a thrust washer inserted into the space and supported by a round end of the second portion of the shaft, and the yoke includes a first yoke forcibly inserted around an outside surface of the bearing holder, and having the counterweight formed on a portion of the upper yoke, and a second yoke forcibly inserted around the outside surface of the bearing holder, and having a ring type magnet.

According to another aspect to the present invention, the second yoke is formed of a soft magnetic material.

According to another aspect to the present invention, the bearing holder includes a cap shape having an opening open to the base plate, another inside surface forming a space with the bearing, and a thrust washer inserted into the space and supported by a round end of the second portion of the shaft, and the yoke is forcibly inserted around an outside surface of the bearing holder to be fixedly coupled to the bearing holder and includes a first portion limiting a movement of the counterweight with the bearing holder in an axial direction and in a radial direction of the shaft, and a second portion mounted with the magnet having a ring type.

According to another aspect to the present invention, the bearing holder includes a cap shape having an opening open to the base plate, another inside surface forming a space with the bearing, and a thrust washer inserted into the space and supported by a round end of the second portion of the shaft, and the yoke includes a first yoke forcibly inserted around an outside surface of the bearing holder and formed asymmetrically with respect to the shaft to eccentrically rotate the rotor, and a second yoke forcibly inserted around the outside surface of the bearing holder and formed with the magnet having a ring type.

According to another aspect to the present invention, the second yoke is formed of a soft magnetic material.

According to another aspect to the present invention, the first yoke is formed of a metal having a specific gravity of less than 10.

According to another aspect to the present invention, the bearing holder includes a cap shape having an opening open to the base plate, the yoke is coupled to an upper surface of the bearing holder, the magnet is a ring-type disposed on the yoke, and the counterweight is disposed on the yoke.

According to another aspect to the present invention, the yoke forms a space with the bearing holder, and the rotor includes a hole formed on a portion of the bearing holder to communicate with the space and an outside of the bearing holder, and a thrust washer having one portion inserted into the hole and the other portion disposed in the space between the portion of the bearing holder and the shaft to be supported by a curved end of the second portion of the shaft.

According to another aspect to the present invention, the rotor includes an air circulation hole formed on one of the bearing holder and the thrust washer and communicating with a space surrounded by the bearing, the thrust washer, and the shaft.

According to another aspect to the present invention, the yoke includes a circumference bent toward the base plate, the magnet includes an inner surface supported by an outer surface of the bearing holder and disposed on the yoke, and the counterweight includes a protrusion having a step shape in an radial direction of the shaft and disposed between an outer circumferential surface of the magnet and an inside surface of the circumference of the yoke.

According to another aspect to the present invention, the motor is a mono phase drive type having a non-motive point, and the rotor includes a cogging torque generating unit disposed on one of the base plate and the cover to prevent the non-motive point.

According to another aspect to the present invention, the magnet includes a plurality of magnetic poles having a first angle with respect to the shaft, the coil includes a center line extended from the shaft, and the cogging torque generating unit is disposed on a line forming a second angle of a quarter of the first angle of the coil with respect to the center line of the coil.

According to another aspect to the present invention, the magnet includes 6 magnetic poles, the coil includes a center line extended from the shaft, and the cogging torque generating unit is disposed on a line having an angle of 15 degrees with respect to the center line of the coil.

According to another aspect to the present invention, the magnet includes 6 magnetic poles, the coil comprises sub-coils each having a center line extended from the shaft, and the cogging torque generating unit includes sub-cogging torque generating units each disposed on a line having an angle of 15 degrees with respect to corresponding center line of the sub-coils.

BRIEF DESCRIPTION OF THE DRAWINGS

These and/or other advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
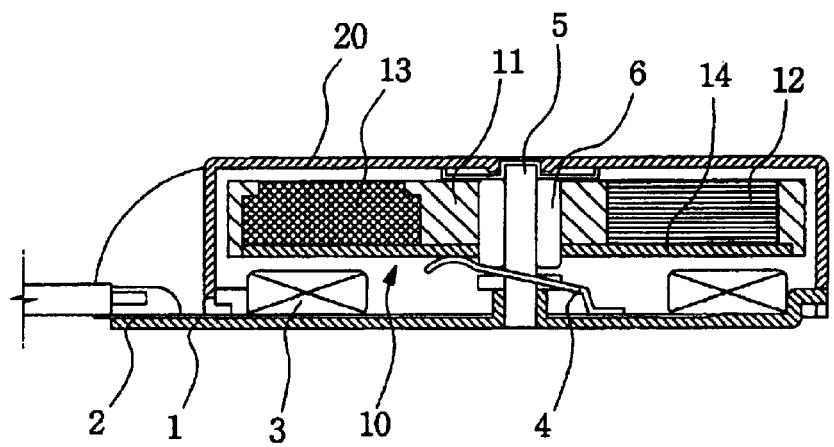
FIG. 1 is a cross-sectional view of a brush-type vibration motor.

Reference will now be made in detail to the present preferred embodiments of the present invention, examples of which are illustrated in the accompanying drawings, wherein like reference numerals refer to the like elements throughout. The embodiments are described below in order to explain the present invention by reference to the figures.

Hereinafter, a brushless vibration motor according to an embodiment of the present invention is explained in conjunction with drawings. In this embodiment, durability and rotation characteristics of a vibration motor are improved using an improved assembled structure of a rotor rotating about a shaft. Miniaturization and compatibility of the vibration motor increase, and a non-motive point problem occurring in a case that the vibration motor is a mono phase type, is prevented using a cogging generating unit.

Figure 4B:
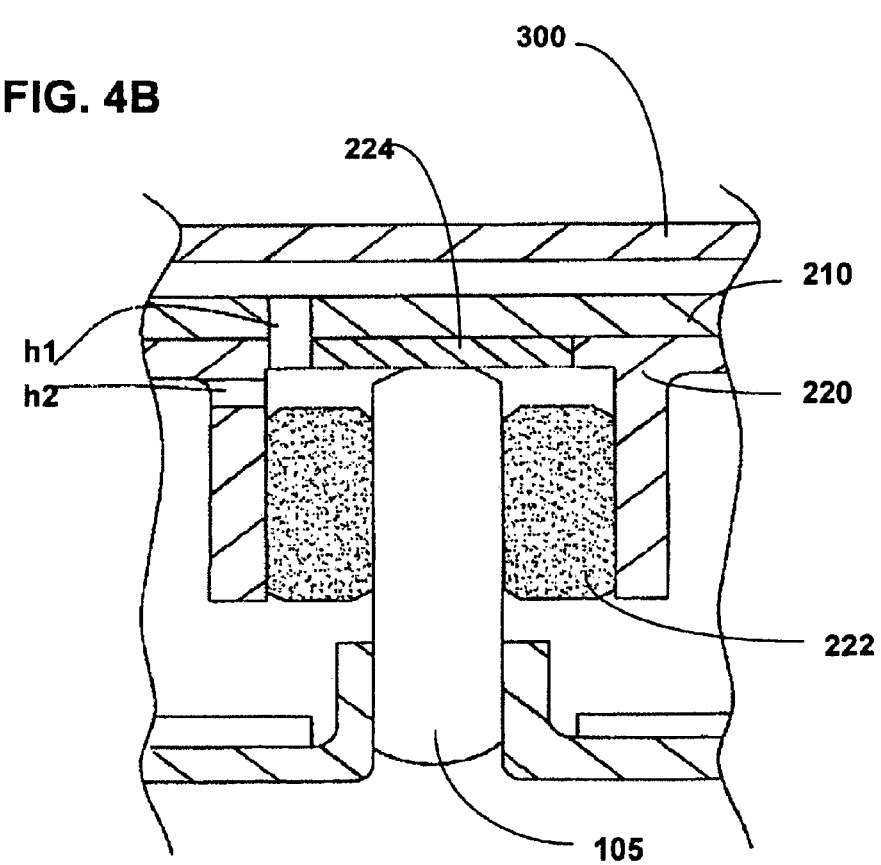
FIG. 4B is an enlarged, fragmentary view of the central portion of FIG. 4A, and FIGS. 4A and 4B will also be referred to collectively as "FIG. 4"
Figure 2:
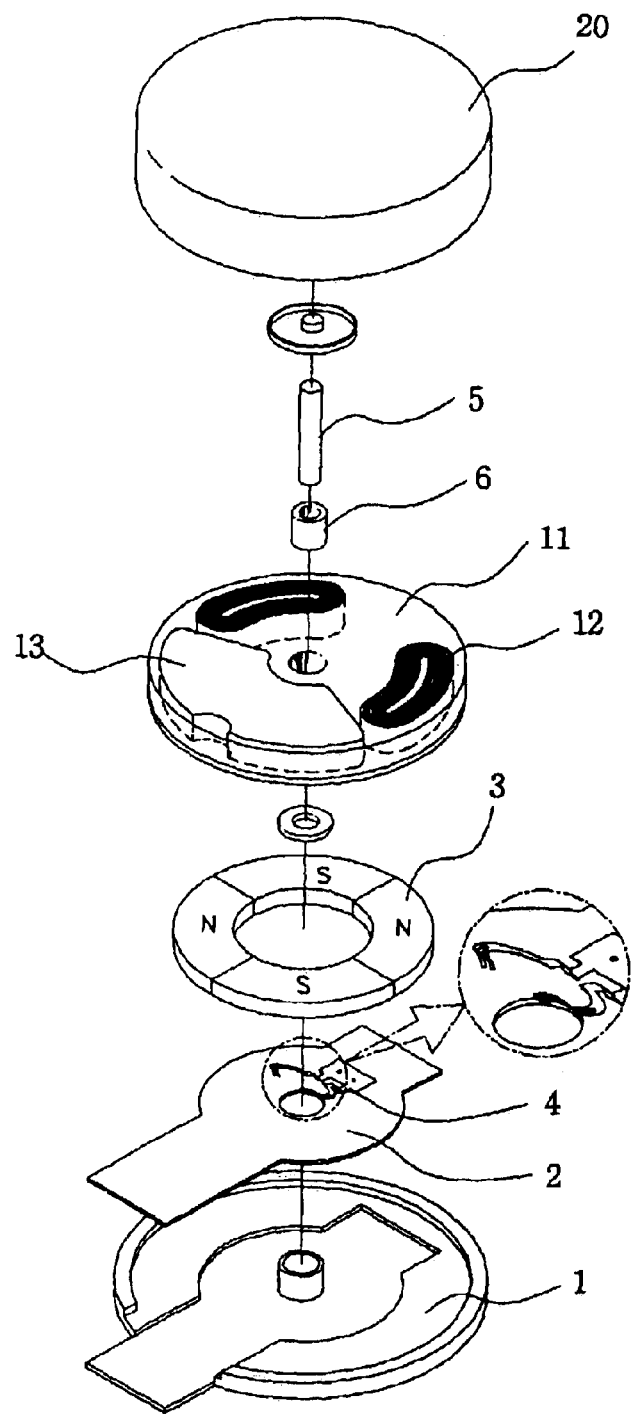
FIG. 2 is an exploded view of the brush-type vibration motor shown in FIG. 1.
Figure 3A:
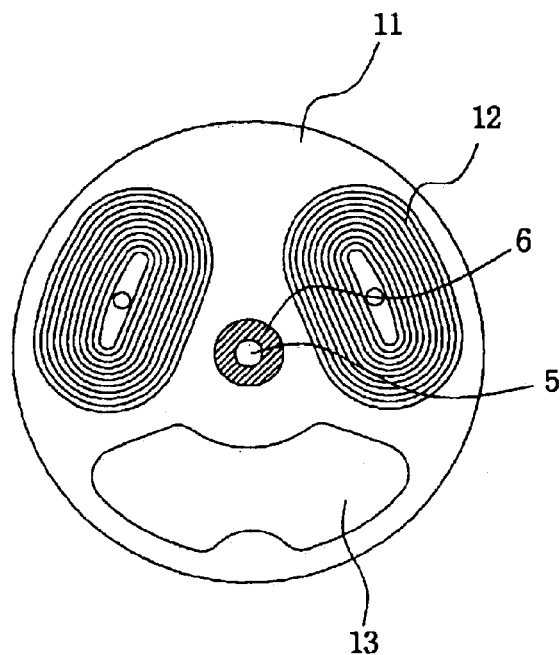
FIG. 3A is a plan view showing an arrangement of a coil and a commutator of the brush-type vibration motor shown in FIGS. 1 and 2.
Figure 3B:
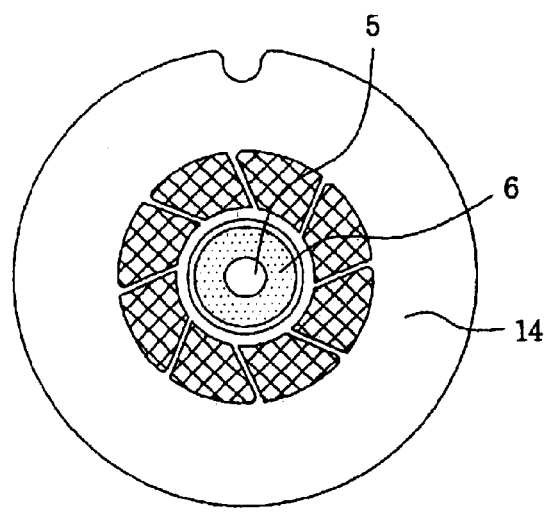
FIG. 3B is a plan view showing the commutator contacting a brush of the brush-type viration motor shown in FIGS. 1 and 2.
Figure 4A:
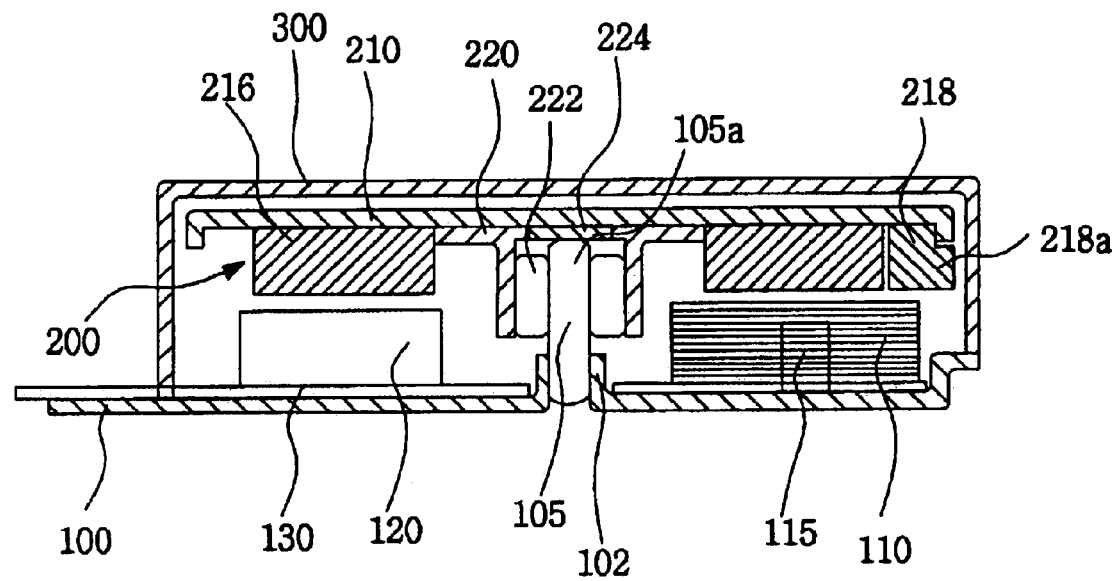
FIG. 4A is a brushless vibration motor according to an embodiment of the present invention.
Figure 5:
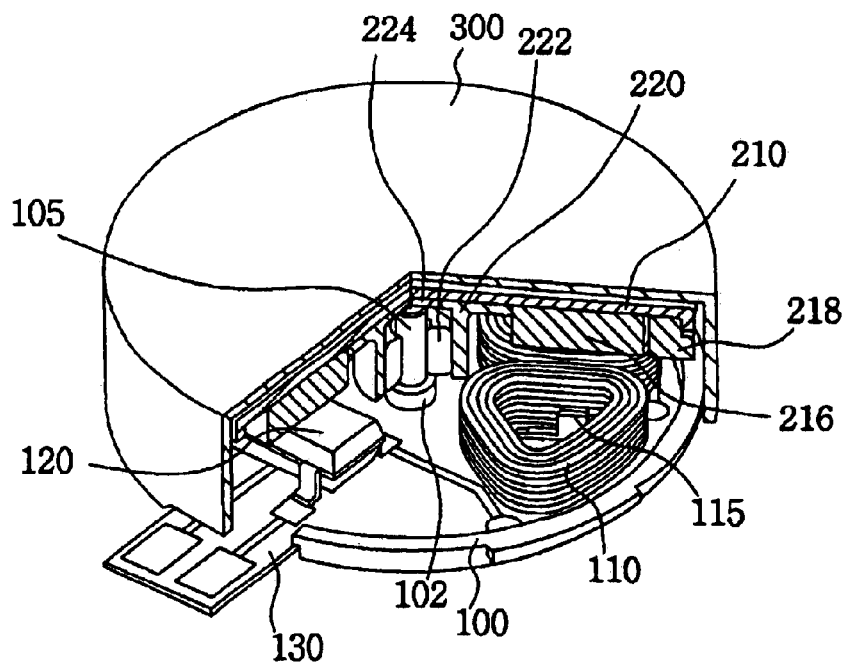
FIG. 5 is a partial perpective view of the brushless vibration motor shown in FIG. 4.
Figure 6:
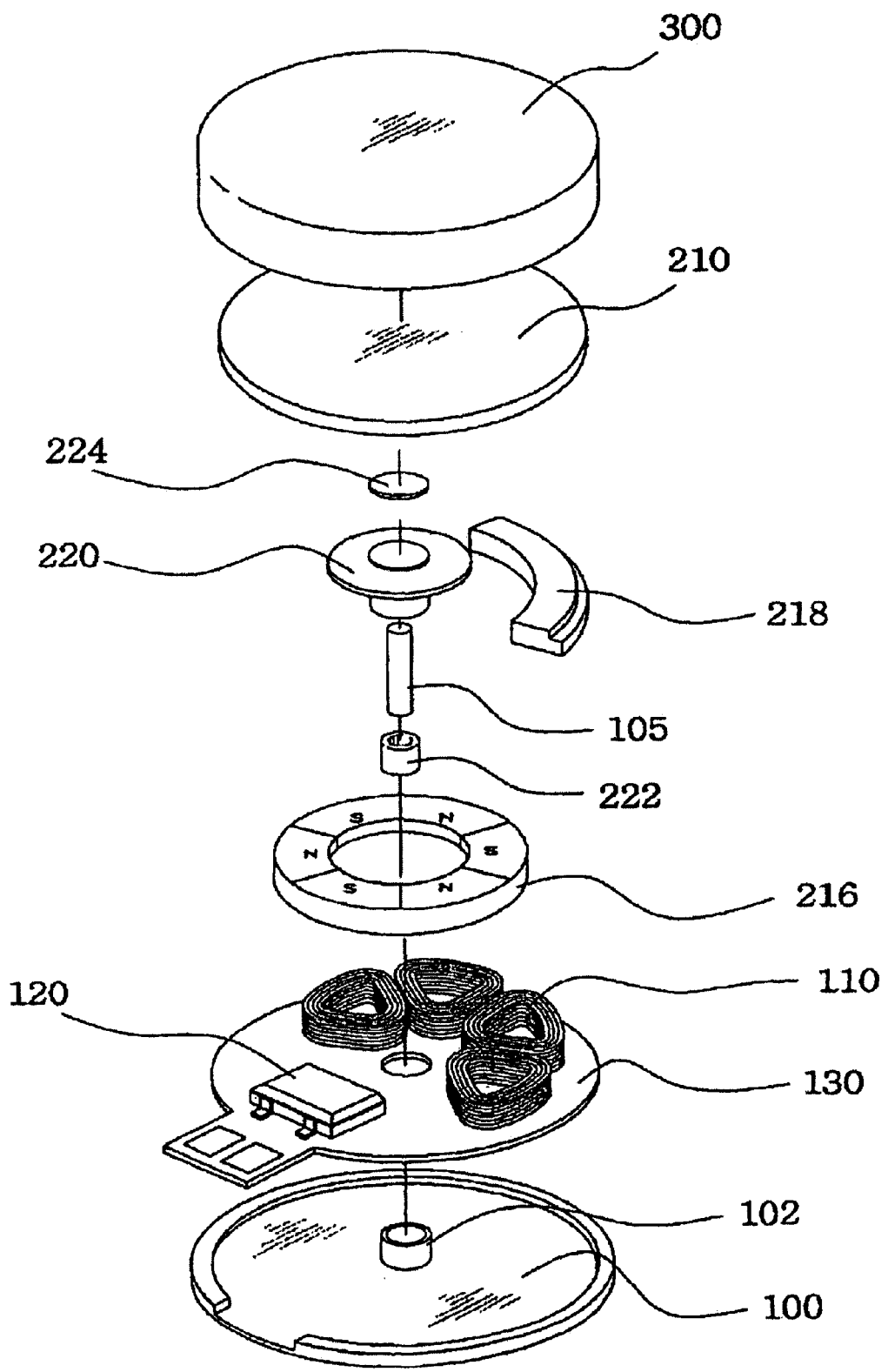
FIG. 6 is an exploded view of the brushless vibration motor shown in FIG. 4.

FIG. 4A is a cross-sectional view of the brushless vibration motor, FIG. 4B is an enlarged, fragmentary view of the central portion of FIG. 4A, and FIGS. 4A and 4B will also be referred to collectively as "FIG. 4." FIG. 5 is a partial perspective view of the brushless vibration motor shown in FIG. 4, and FIG. 6 is an exploded view of the brushless vibration motor shown in FIGS. 4 and 5.

As shown in FIGS. 4 through 6, a fixed (base) plate 100 includes a circular shape having an upper surface, a bottom surface, and a side surface, and a burring element 102 having an inner diameter and protruding upward from a center portion of the fixed plate 100. A shaft 105 is forcibly inserted into the burring element 102 to be fixedly coupled to the burring element in a vertical direction, and the shaft 105 has an outer diameter which is the same as the inner diameter of the burring element 102.

A printed circuit board 130 is disposed on the upper surface of the fixed plate 100, and a motor drive integrated circuit (IC) 120 is disposed on the printed circuit board 130 to rotate a rotor 200 by controlling a coil 110 and a current flowing through the coil 110. A hall element (not indicated by a reference numeral) can be integrally installed in or separately installed from the motor drive IC 120 to detect respective polarities of magnetic poles of a magnet 216 of the rotor 200. In this embodiment, the hall element is installed in the motor drive IC 120.

A plurality of electrical input/output terminals are formed on the printed circuit board 130 to electrically connect the coil 110 and the motor drive IC 120 and connect the printed circuit board to an external source. In order to realize the brushless vibration motor in a mobile telecommunication machine, such as a wireless phone, it is necessary to provide additional terminals formed on the bottom surface of the fixed plate 100 to communicate with external equipment or an external printed circuit board. In this case, the additional terminals or an additional printed circuit board can be formed on the bottom surface of the fixed plate 100 and connected to the printed circuit board 130.

It is possible that the additional terminals or the additional printed circuit board may be formed on the upper surface of the fixed plate 100 and connected to the printed circuit board 130. It is also possible that the additional terminals or the additional printed circuit board can be integrally formed with the motor drive IC 120 in the printed circuit board 130 on the fixed plate 100.

It is also possible that the fixed plate 100 is formed in a double-sided printed circuit board having an upper side and a lower side on which arrangements of terminals and circuit lines are simplified, and the fixed plate 100 or the brushless vibration motor can be more closely connected to the external equipment or the external printed circuit board.

A non-motive point may occur in the brushless vibration motor since the brushless vibration is a mono phase driving type. A cogging torque generating unit 115 is disposed at a position of the fixed plate 100 corresponding to the coil 110 to prevent the non-start point. The cogging torque generating unit 115 can be integrally formed in the fixed plate 100 in a single body during forming the fixed plate 100 or separately formed from the fixed plate to be fixedly coupled to the fixed plate 100.

An arrangement and a structure of the coils 110 forming a stator, the motor drive IC 120 controlling a current of the coils 110, and the cogging torque generating unit 115 formed on the fixed plate 100 will be described later in conjunction with FIGS. 7 through 11 after a structure 200 is explained.

The rotor 200 is disposed to be spaced-apart from the coil 110 by a predetermined distance to face the motor drive IC 120 and the coil 110. The rotor 200 includes a bearing holder 220 having a bearing 222, a yoke formed with a magnet and a counterweight 218, and a thrust washer contacting the shaft 105.

The bearing 222 is forcibly inserted into the bearing holder 220 to slidably move around the shaft 105 forcibly fixedly inserted into the fixed plate 100. The bearing holder 220 includes a distal end being open downward and having a diameter to receive the bearing 222, thereby slidably rotating the rotor 200 about the shaft 105 through the bearing 222. The bearing 222 is forcibly inserted inside the distal end of the bearing holder 220. The bearing holder 220 includes a portion having a through hole having another diameter narrower than an inner diameter of the bearing 222 which is forcibly inserted into the distal end of the bearing holder 220. An outer circumference of the distal end of the bearing holder 220 is extended outward.

The bearing 222 slides along an outer surface of the shaft 105 to rotate about an center axis of the shaft 105 during rotating the rotor 200. The bearing 222 is designed to form a lubrication film with the outer surface of the shaft 105 to allow the rotor 200 to stably rotate with little friction. The bearing 222 used in this embodiment is a sinter containing a lubrication oil.

The yoke 210 is disposed around the shaft 105 on an outer circumferential surface of the bearing holder 220 to have a uniform radius with respect to the shaft 105 and is coupled to the bearing holder 220 by a spot welding method. A circumference of the yoke 210 is bent and extended downward to have a downward cap-shape. The yoke 210 is made of a material a soft magnetic material to provide a path through which a magnetic field flows in a desirable direction.

A bottom side of the yoke 210 forms a space with an inside portion of the through hole of the bearing holder 220, and the thrust washer 224 is inserted in the space formed by the inside portion of the bearing holder 220. Since the thrust washer 224 is fixedly disposed between the yoke 210 and the bearing holder 220, no additional part is not needed to fixedly couple the thrust washer 224 to the yoke 210.

The thrust washer 224 rotatably supports the rotor 200 in an axial direction of the shaft 105 by contacting an end of the shaft supported by the bearing 222. In this embodiment, the shaft 105 has an end 105a having a rounded shape to point-contact the thrust washer 224. With the thrust washer 224 and the shaft 105 having the above structure, a reduced load of the rotor 200 is supported in the axial direction, an RPM of the brushless vibration motor increases, and noise and a consumed current decrease.

As best seen in FIG. 4B, there is an interior space defined between the bearing holder 220 and the bearing 222. In this embodiment, a hole h2 is formed in the wall of the bearing holder which surrounds the space, and the space communicates with the outside of the bearing holder through this hole. A hole h1 is also formed in the thrust washer 224 which communicates with the interior space of the bearing holder. This interior space is surrounded by the bearing 222, the thrust washer 224 and the shaft 105.

The end 105a of the shaft 105 is rotatably supported by the thrust washer 224 disposed in the bearing holder 220 of the rotor 200 in this embodiment. However, the invention is not limited thereto. It is possible that a washer provided in a center of the rotor 200 may contact the end 105a of the shaft 105. It is also possible that according to a coupling structure of the bearing holder 220 and the yoke 210, the thrust washer 224 is inserted in the space formed between the through hole of the bearing holder 220 and the yoke 210 or any other space between the hearing holder 220 and the bearing 222 to contact the end 105a of the shaft 105. It is possible that the thrust washer 224 point-contacts a rounded portion formed on the end 105a of the shaft 105.

The magnet 216 having a ring type with magnetic poles is disposed in an inside area (a bottom surface area) of the yoke 210 to face the coil 110 and the fixed plate 100. A portion of the inside area of the yoke 210 is disposed to contact an upper surface of the bearing holder 220 and fixedly supported by the bearing holder 220, thereby limiting a movement of the rotor 200 in a radial direction of the bearing holder 220.

The yoke 210 includes two half portions disposed opposite to each other with respect to the shaft 105, and a counterweight 218 having a predetermined weight and predetermined radius and curvature is disposed in one of the two half portions of the yoke 210 to eccentrically rotate the rotor 200. The counterweight 218 is disposed between the inside portion of the yoke 210 (an inside area of a portion bent and extended from a circumference of the yoke 210 downward) and an outside portion of the magnet 216. In this embodiment, the counterweight 218 includes a step portion 218a to increase the weight. An upper portion of the step portion 218a of the counterweight 218 is fixedly coupled to and supported by the yoke 210.

A side portion of the step portion 218a of the counterweight 218 is disposed on a position spaced-apart from an center of the shaft 105 more than the upper portion of the step portion 218a, thereby increasing an amount of eccentricity.

A cover 300 having the cap shape being open downward is fixedly coupled to the fixed plate 100 to cover and include the rotor 200, the coil 210 as the stator, the motor drive IC 120, and the cogging torque generating unit 115.

Although the non-motive point occurs in the mono phase drive type of the brushless vibration motor, the mono phase drive type of the brushless vibration motor can be manufactured in a size smaller than a double phase or three phase type of the brushless vibration motor. Accordingly, since only the one coil 110 is used to drive the rotor 200 in the brushless vibration motor, miniaturization of a vibration motor can be achieved.

In this embodiment, the brushless vibration motor is driven by the mono phase drive method, the magnet 216 attached to the rotor 200 to generate a mutual electromagnetic force with the coil 210 includes 6 magnetic poles, the cogging torque generating unit 115 preventing the non-motive point which is one of disadvantages of the mono phase drive type, is mounted in the brushless vibration motor, and the motor drive IC 120 is mounted on the fixed plate 100 together with the coil 110 to form an integrated body in the brushless vibration motor so as to be miniaturized and compatible with any type of the vibration motor.

The arrangement and the structure of the coil 110 forming a stator, the motor drive IC 120 controlling the current of the coil 110, and the cogging torque generating unit 115 formed on the fixed plate 100 will be described hereinafter in conjunction with FIGS. 7 through 11.

Figure 7:
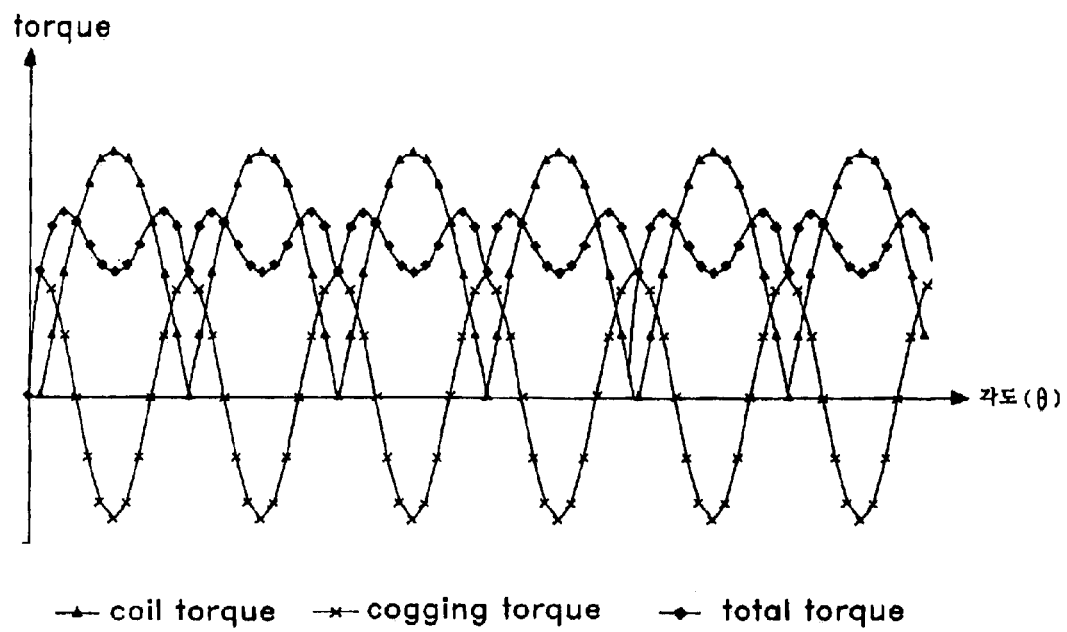
FIG. 7 is a view showing a graph of a coil torque, a cogging torque, and a total torque in a mono phase driving type brushless vibration motor.
Figure 8:
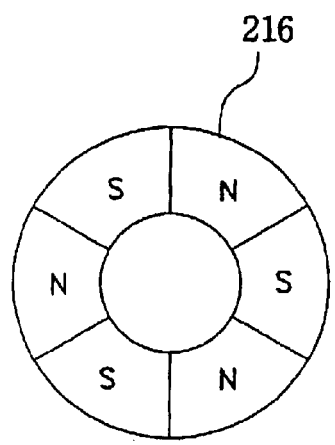
FIG. 8 is a view showing a magnet in a case that the brushless vibration motor shown in FIG. 4 is the mono phase type brushless vibration motor.
Figure 9:
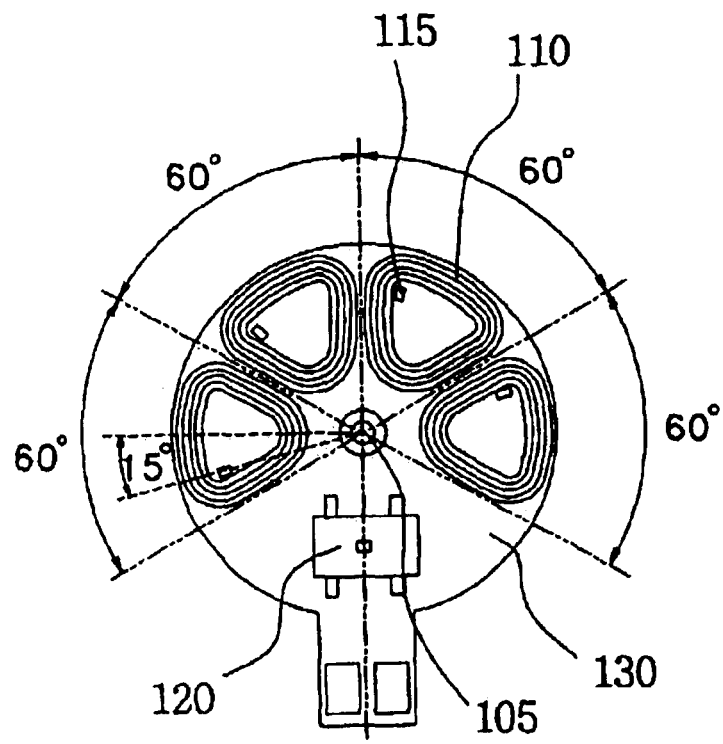
FIG. 9 is a view showing an arrangement of a cogging torque generating unit and a coil corresponding to the magnet shown in FIG. 8.

FIG. 7 is a view showing a graph of respective torque generating according to a rotation angle of the rotor 200, FIG. 8 is a view showing the magnet 216 having the six magnetic poles, and FIG. 9 is a view showing an arrangement of the cogging torque generating unit 215, the motor drive IC 120, and the coil 110 corresponding to the magnet 216 shown in FIG. 8.

As shown in FIG. 7, the non-motive point is indicated by a position in which an amount of a coil torque generated by an interaction between the magnet 216 and the coil 110 in the mono phase drive type becomes zero. That is, the rotor 200 becomes non-motivated at the non-motive point. In this case, when a cogging torque as shown in FIG. 7 is generated, a total torque, which is a sum of the coil torque and the cogging torque, maintains constant regardless of a rotation position of the rotor 200, and the rotor 200 continues to rotate.

When the coil 110 is arranged with respect to the motor drive IC 120, generally an effective rotation torque is generated in a case that a size of the coil 110 mounted on the fixed plate 100 is the same as one magnet pole of the magnet 216.

A hall element of the motor drive IC 120 is disposed between different magnet poles, e.g., N and S polarities of the magnet poles, the hall element detects a magnet field, and the motor drive IC 120 is able to alternatively control the current flowing through the coil 110 according to a detection of the hall element. Therefore, the coil 110 is disposed to face the one magnet pole of the magnet 216 so that the hall element is disposed between the different magnet poles of the magnet 216.

In order to stably rotate the rotor 200, the coil 110 and the motor drive IC 120 are disposed on the same plane as the fixed plate 100, and a magnetic substance is disposed to generate the cogging torque using another interaction with the magnet 216. The above and/or other factors should be considered when the coil 110, the motor drive IC, the magnet 216, and the cogging torque generating unit 115.

As show in FIG. 9, each of four coils 110 has a flat shape, includes two sides forming an angle of 60 degrees with respect to the shaft 105, e.g., the same angle of 60 degrees as one of six magnet poles of the magnet 216, and is disposed on the printed circuit board 130 of the fixed plate 100 to face the magnet 216 mounted on the yoke 210.

An area of the coils 110 covers 240 degrees of a total area of the printed circuit board 130 corresponding to magnet 216 with respect to the shaft 215, and the hall element is disposed in a remaining area corresponding to a remaining 120 degrees of the total area of the printed circuit board 130 corresponding to magnet 216 with respect to the shaft 215. A center of the motor drive IC 120 is disposed on a center line evenly dividing the remaining area and the remaining 120 degrees and perpendicularly crossing the axial direction of the shaft 105. The motor drive IC 120 is disposed on a position at 270 degrees in a rotation direction of the rotor 200 with respect to a line corresponding to an outermost side of the coils.

Four cogging torque generating units 115 are disposed on respective positions on the fixed plate 100. Each cogging torque generating unit 115 is disposed on the position spaced-apart from a side of corresponding coils 110 by 15 degrees, e.g., a quarter of 60 degrees of the magnetic pole of the magnet 216, with respect to the shaft 105, and protrudes from the fixed plate 100 or the printed circuit board 130 by a predetermined height.

The cogging torque generating units 115 modify respective magnet fields of the coils 110 and are formed of the magnetic substance to generate a constant cogging torque. In this embodiment, each cogging torque generating unit 115 is disposed on the position spaced-apart from a center line of corresponding coils 110 by 15 degrees since the cogging torque is desirably generated when the cogging torque generating unit 115 is disposed at a quarter of 60 degrees of the magnetic pole of the magnet 216, with respect to the shaft 105 according to experiments on the cogging torque.

Although the number of the cogging torque generating units is the same as the coils 110, the invention is not limited thereto. As shown in FIG. 9, since each position of the cogging torque generating units 215 is disposed to be spaced-apart from the center line of the corresponding one of the coils 110 by 15 degrees, the cogging torque generating units 115 are disposed to be spaced-apart from each other by 60 degrees. The number of the cogging torque generating units 115 can be 6 when the cogging torque generating units 115 are disposed on the total area of the printed circuit board 130 corresponding to magnet 216 with respect to the shaft 215.

In this embodiment, the cogging torque generating units 115 are disposed on the fixed plate 100. However, the invention is not limited thereto. According to an arrangement of the coils 110, it is possible that the cogging torque generating units 115 can be mounted on the cover 300 if there is no space enough to install the cogging torque generating units 115 on the printed circuit board 130 or the fixed plate 100.

Figure 10:
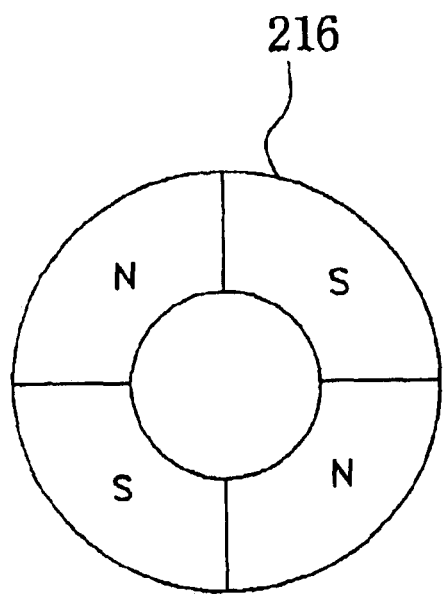
FIG. 10 is a view showing another magnet of the brushless viration motor shown in FIG. 4.
Figure 11:
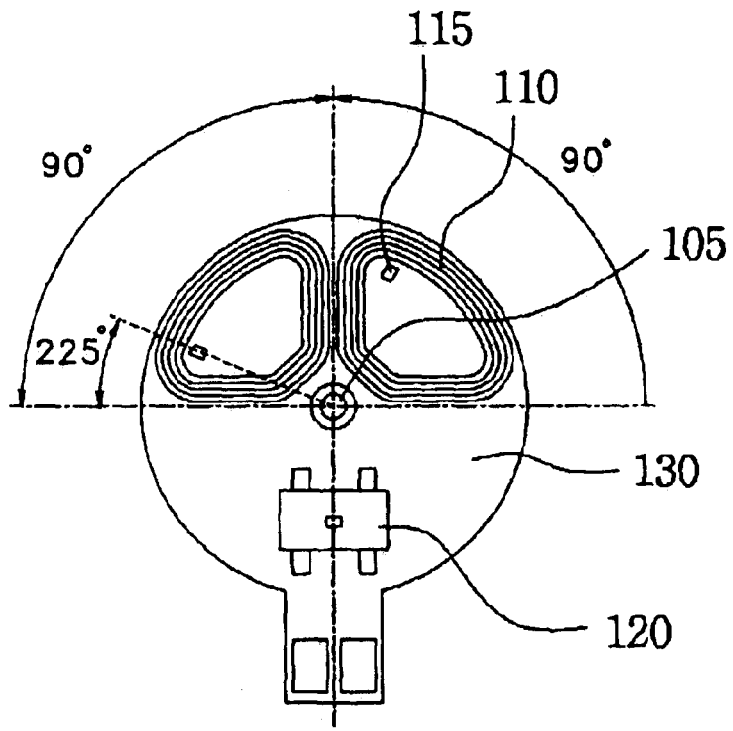
FIG. 11 a view showing an arrangement of a cogging torque generating unit and a coil corresponding to the magnet shown in FIG. 10.

FIGS. 10 and 11 are views showing the magnet 216 having 4 magnet poles and an arrangement of the cogging torque generating unit 215, the motor drive IC 120, and the coils 110 corresponding to the magnet 216.

As shown in FIG. 11, since one of the magnetic poles forms an angle of 90 degrees with respect to the shaft 105, two coils 110 each having the angle of 90 degrees with respect to the shaft 105 are disposed on the printed circuit board 130 in a range of 180 degrees with respect to the shaft 105. The motor drive IC 120 is disposed in a remaining range of 180 degrees with respect to the shaft 105 to detect the magnetic field of the magnetic poles of the magnet 216.

The cogging torque generating units 115 are disposed to be spaced-apart from the center line of the corresponding coils 110 by an angle of 22.5 degrees, e.g., a quarter of 90 degrees of one magnet pole of the magnet 216, with respect to the shaft 105.

An arrangement of the magnetic poles of the magnet 216 in the mono phase drive type and another arrangement of the coils 110 and the motor drive IC 120 in the double and three phase drive types should be associated with other factors and the rotation electromagnetic force between the magnet 216 and the coils 110 as well as the rotational characteristics of the rotor 200.

An operation of the brushless vibration motor having the above structure is explained in detail here in after.

First, a control signal is transmitted to the motor drive IC 120 to the rotor 200 of the brushless vibration motor. A semiconductor switching element of the motor drive IC 120 is turned on, and a current flows from an external power source through the coils which is controlled by the semiconductor switching element.

A magnetic field is generated around the coils 110 through which the current flows, and the magnetic field interacts with an other magnetic field generated from the magnet 216 which forms a space with the coils 110 and is disposed on the bottom surface of the rotor 200, so as to form the magnetic path through the soft magnetic substance of the yoke according to the magnetic field and another magnetic field.

The rotation electromagnetic force is generated in the space according to the interaction between the coils 110, e.g., the stator, and the magnet 216 of the rotor in a direction of the rotation electromagnetic force. The bearing 222 slides along the outer surface of the shaft 105, the bearing holder 220 forcibly coupled to the bearing 222 rotates in the same direction as the bearing 222.

The yoke 210 coupled to the bearing holder 220 starts to rotate according to a rotation of the bearing holder 220, and the rotor 200 starts to rotate in a uniform speed with a predetermined torque. The thrust washer 224 inserted into the through hole of the bearing holder 220 and disposed on a center portion of the rotor 200 starts to rotate while point-contacting the end 105 a of the shaft 105 on its lower surface. According to an axial structure of the rotor 200, the shaft 105 generates a reduced load with the rotor 200 while supporting the reduced load of the rotor 200 so that the rotation speed is improved, the consumed current is reduced, and a power loss decreases.

A circumference surrounding the shaft 105, the bearing 222, the bearing holder 200, and the thrust washer 224 is isolated from an outside of the circumference and forms an insulated space, and thus a sliding movement of the shaft 105 and the bearing holder 220 may become unstable because air expands in accordance with temperature rising due to a friction between them. In this embodiment, and air circulation hole having a small diameter is formed on a portion of the bearing holder 220 to communicate with external air of the outside of the circumference.

According to he rotation of the rotor 200, the hall element of the motor drive IC 120 disposed as shown in FIG. 9 detects the polarity of respective magnetic poles of the magnet 216 rotating together with the rotor 200. A position of the respective magnetic poles of the magnet 216 with respect to the coils 110 varies according to the rotation of the rotor 200. When the coils 110 corresponding to the corresponding magnetic poles of the magnet 216 are excited, the rotation electromagnetic force generated according to the interaction between the coils 110 and the magnet 216 is maintained in the rotation direction of the rotor 200. Accordingly, the rotor can continue to rotate in the rotation direction, e.g., a single direction.

A commutator and a brush used in a conventional mono phase brush vibration motor are replaced with the hall element, e.g., a position sensor, and an output of the hall element is transmitted to the motor drive IC 120 turning on and off the semiconductor switching element coupled to the corresponding coils 110 to allow the current to flow through the respective coils 110.

The magnetic field is formed in the coils 110 to rotate the rotor 200 in the rotation direction according to an amount and a direction of the current flowing through alternatively corresponding coils 110, and the magnet 216 is pulled and pushed according to the same polarities and the opposite polarities between the magnet 216 and the coils 110, respectively, so that the rotor stably rotates. Thus, the arrangement of the coils 110 of the stator and a winding direction of the coils 110 should be associated with the torque and rotation speed of the rotor 200 when the rotor 200 is designed.

When self weight centers of the coils 110 and the magnet 216 become identical, the torque is weakened to stop the rotation of the rotor 200 at the non-motive point corresponding to the self weight centers, and thus initial starting of the rotor 200 cannot be achieved. If the cogging torque generating units 115 are disposed adjacent to the side of the corresponding coils 110, a combination of the magnet field of the coils corresponding to the magnet 216 and another magnetic field of the cogging torque generating unit 115 becomes deviated from the self weight center of the magnet 216, and the non-motive point is removed from the rotor 200 due to the characteristic of the rotation electromagnetic force, thereby enabling the rotor 200 to perform a self starting and continue to rotate.

As shown in FIG. 7, the cogging torque generating units 115 generate the cogging torque at the non-motive point corresponding to a position in which the coil torque becomes a minimum value during the rotation of the rotor 200, and the cogging torque is combined with the coil torque to generate the total torque which is not zero at the non-motive point.

When the magnet 216 of the rotor 200 rotates by the interaction with the coils 110 and the cogging torque generating unit 115, the rotor 200 eccentrically rotates due to the counter weight 218 mounted on a side portion of the yoke 210 of the rotor 200 to generate a vibration and a user is notified by the vibration that a signal is received or an alarm is generated.

The cover 300 encloses the rotor 200, the coils 110, and the motor drive IC120 to protect the same from an external impact and foreign materials by blocking the foreign material.

Unlike a conventional vibration motor having a bearing or a bearing holder mounted on a fixed plate or supported by an end of a shaft supported by an inside surface of a cover, the brushless vibration motor according to this embodiment of the invention improves an assembling structure of respective parts constituting the rotor 200, and durability, strength, and the rotation characteristic of the rotor 200.

Figure 12:
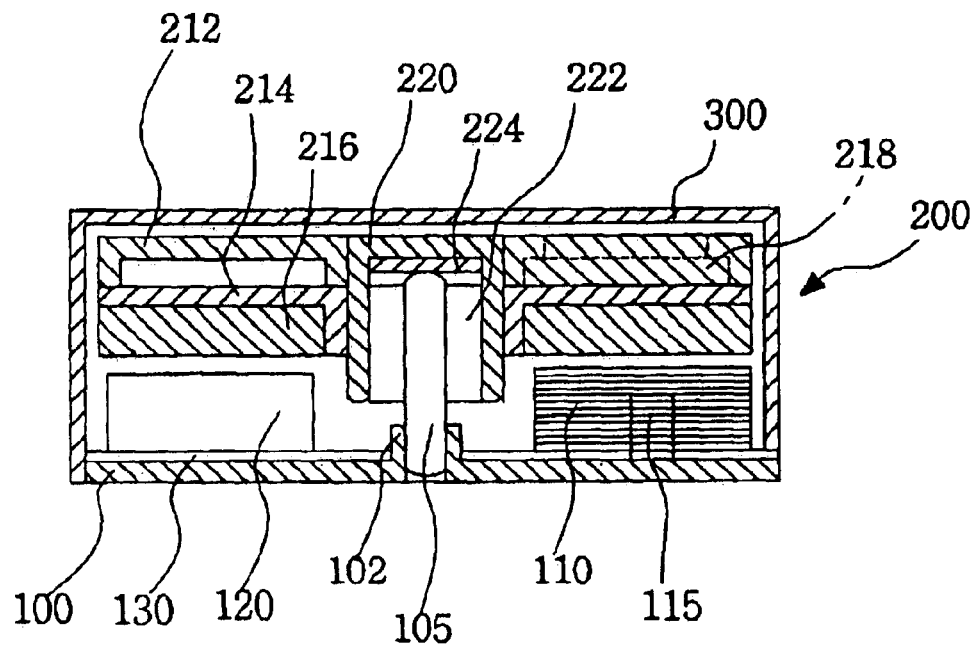
FIG. 12 is a view showing another brushless vibration motor according to another embodiment of the present invention.
Figure 13:
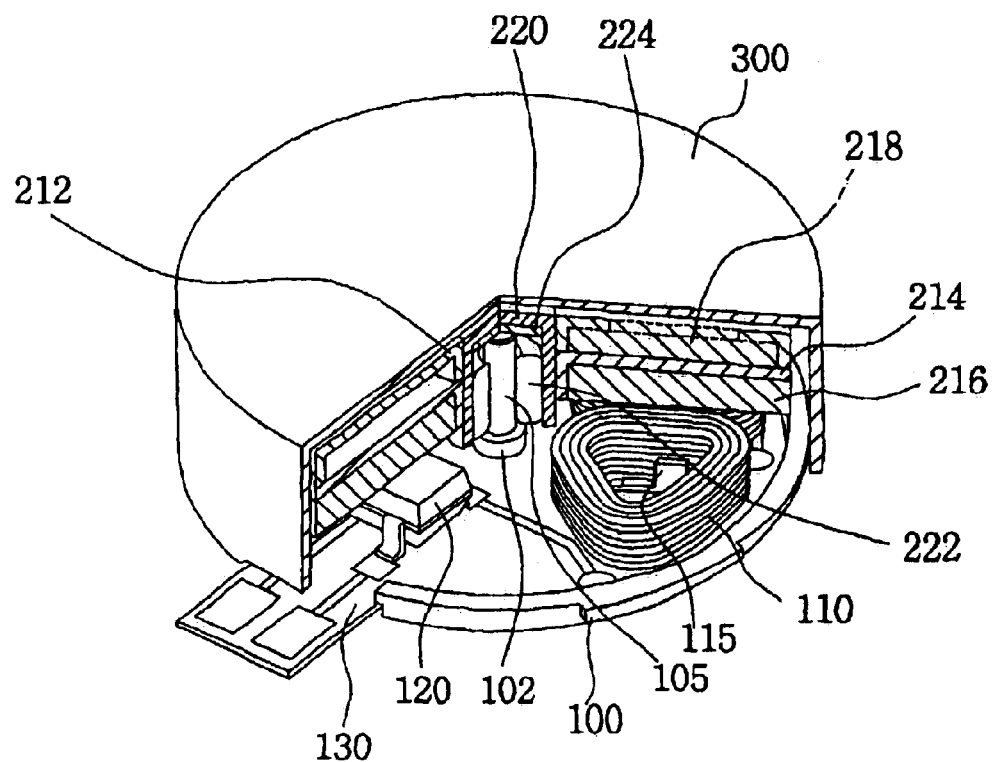
FIG. 13 is a partial perspective view of the brushless vibration motor shown in FIG. 12.

Here in after, an operation and a structure of another brushless vibration motor according to another embodiment of the present invention are explained in detail. FIG. 12 is a cross-sectional view of the brushless vibration motor, FIG. 13 is a partial exploded view of the brushless vibration motor shown in FIG. 12. A structure of the rotor 200 as shown in FIGS. 12 and 13 is different from the rotor 200 shown in FIG. 4. The overall structure and operation of the brushless vibration motor shown is FIGS. 12 and 13 are the same as and in understood through the brushless vibration motor shown in FIG. 4, and detailed descriptions will be omitted accordingly. A particular portion of the brushless vibration motor will be described.

As shown in FIGS. 12 and 13, the rotor 200 is disposed above the coils 110 to face the coils 110 and the motor drive IC 120 with a predetermined distance the rotor 200 includes the bearing holder 220, the bearing 224 forcibly inserted into an inside portion of the bearing holder 220, the yoke 210 having the counter weight 218 and the magnet 216 generating the magnetic field, the shaft, and the thrust washer contacting the shaft 105.

The bearing holder 220 includes a distal end being open downward and having a diameter to receive the bearing 222, thereby slidably rotating The rotor 200 about the shaft 105 through the bearing 222. The Bearing 222 is forcibly inserted inside the distal end of the bearing holder 220. The bearing holder 220 includes a portion having a through hole having another diameter narrower than an inner diameter of the bearing 222 which is forcibly inserted into the distal end of the bearing holder 220. An outer circumference of the distal end of the bearing holder 220 is extended outward. The bearing 222 slides along an outer surface of the shaft 105 to rotate about an center axis of the shaft 105 during rotating the rotor 200.

The hearing holder is forcibly fixedly inserted into inner portions of an upper yoke 212 and a lower yoke 214. The lower yoke 214 is made of the soft magnetic substance as a magnetic field path of the magnet 216 having a ring type and mounted on a bottom of the lower yoke 214 to face the coils 110 mounted on the fixed plate 100. The inner portion of the lower yoke 214 is extended downward and the magnet 216 is inserted into the extended inner portion of the lower yoke 214. An inner surface of the magnet 216 contacts an outer surface of the extended inner portion of the lower yoke 214.

The upper yoke 212 is forcibly inserted around an upper portion of the bearing holder 220 around which the lower yoke 214 is inserted. A portion of the upper yoke 212 forms a space with the lower yoke 214 in a radial direction or in a circular direction of the rotor 200 and the counterweight 218 is inserted into the space and fixedly mechanically coupled b between the upper yoke 212 and the lower yoke 214 in the radial direction and the axial direction of the rotor 200.

The counterweight 218 increases an eccentric amount of the rotor 200 and is formed in a step shape having an lower portion and an upper portion having a diameter smaller than the lower portion. The upper portion of the counterweight 218 is disposed in a cutout portion of the upper yoke 212. The upper yoke 212 has another portion disposed opposite to the cutout portion with respect to the shaft 105 to form the space with the lower yoke 214. Accordingly the rotor 200 rotates by the effectively generated eccentricity.

The thrust washer 224 is inserted into an upper inside portion of the bearing holder 220 into which the bearing 222 is forcibly inserted. The end 105 a of the shaft 105 along which an outside portion of the bearing holder 220 and the bearing slide, has a structure point-contacting the thrust washer 224. The thrust washer 224 rotatably supports the rotor 200 in the axial direction of the rotor 200 and point-contacts the shaft 105 since the end 105a of the shaft 105 is round and has a predetermined curvature. Accordingly, since the load exerted on the shaft 105 is reduced, the shaft 105 stably supports the rotor 200 in the axial direction, and the RPM of the brushless vibration motor increases while the consumed current and noise are reduced. Another brushless vibration motor according to another embodiment of the present invention is shown in FIGS. 14 and 15.

Figure 14:
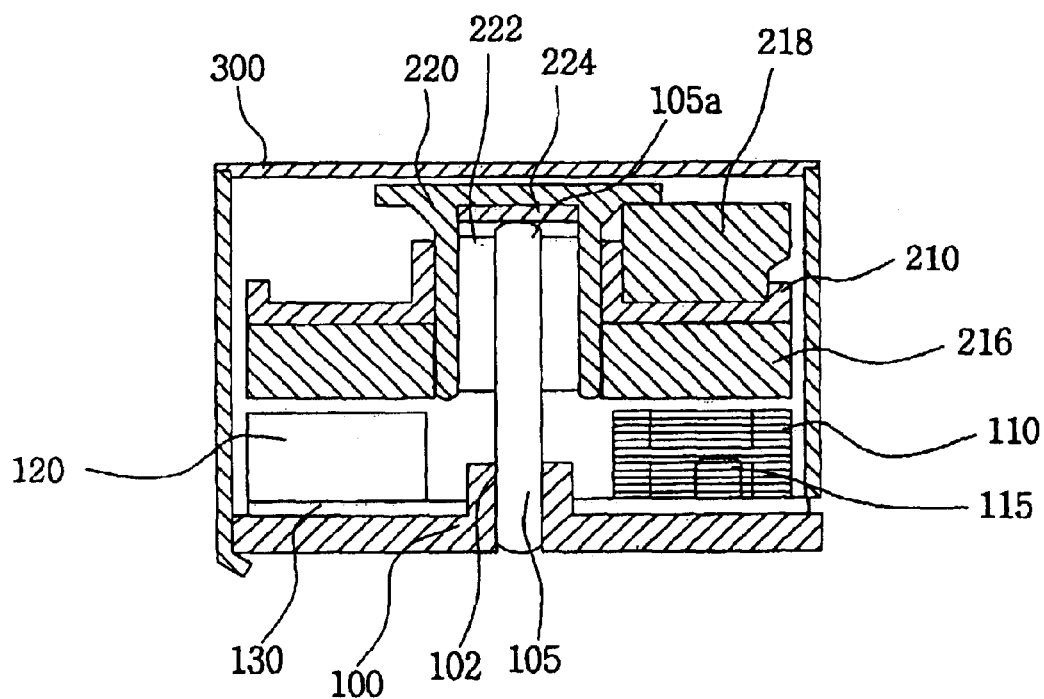
FIG. 14 is a view showing another brushless vibration motor according to another embodiment of the present invention.
Figure 15:
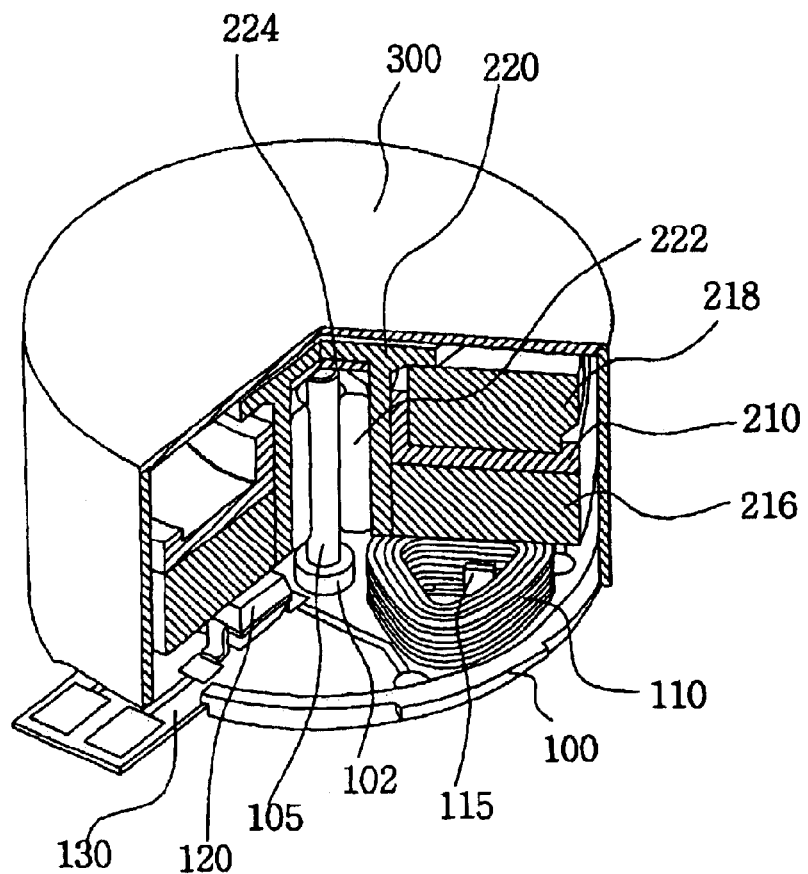
FIG. 15 is a partial perspective view of the brushless vibration motor shown in FIG. 14.

FIG. 14 is a cross-sectional view of the brushless vibration motor, and FIG. 15 is a partial perspective view of the brushless vibration motor. As shown in FIGS. 14 and 15, a structure of the rotor 200 is different from that of the brushless vibration motor shown in FIGS. 4 and 12–13. However, the brushless vibration-motor has the same structure and operation, which can be understood through the structures and the operations in conjunction with FIGS. 4 through 13, the same structure and the same operation are omitted. Accordingly, a particular portion of the rotor 200 will be described here in after.

As shown in FIGS. 14 and 15, the rotor 200 is disposed to be spaced-apart from the coils 110 and the motor drive IC 120 mounted on the fixed plate 100 or the printed circuit board 130 and the coils 110, the motor drive IC120, and the cogging torque generating unit 115 shown in FIGS. 12 and 13 and FIG. 4 are the same. If the brushless vibration motor is the double and three phase drive type, the brushless vibration motor is designed in consideration of the arrangement of the coils 110 and the motor drive IC120, the rotation electromagnetic force generated by the interaction among the coils 110, the magnet 216, and the cogging torque generating unit, and the rotation characteristic of the rotor 200.

An operation of the brushless vibration motor shown in FIGS. 12 and 13 can be understood through the operation of the brushless vibration motor shown in FIG. 4. Accordingly, the detailed description of the operation is omitted.

Like as the brushless vibration motor shown in FIG. 4, the air circulation hole (not shown) is formed on the bearing holder 220 or the rotor 200 to exchange temperature and air between the external portion and the circumference enclosing the bearing holder 220, the bearing 222, and the shaft 105.

The coils 110, the motor drive IC 120, and the cogging torque generating unit 115 form the stator corresponding to the rotor 200, are disposed below the rotor, and arranged an the printed circuit board 130 mounted on the fixed plate 100. Since the brushless vibration motor shown in FIGS. 12 and 13 is the mono phase drive type, to face the coils 110 and the motor drive IC 120. The rotor 200 includes the bearing holder 220 having the bearing 222, the yoke 210 having magnet 216 and the counterweight 218, and the thrust washer 222 contacting the shaft 105.

The embodiments shown in FIGS. 4 through 15 have the same structure as the bearing holder 220, the bearing 222 inserted into the bearing holder 220, the shaft 105 around which the bearing 222 slides and the rotor 200 rotates, and the thrust washer 224 inserted into the bearing holder 220 and supported by the shaft 105. The difference among the embodiments is that the upper outer portion of the bearing holder 220 has an upper circumference extended outward than a lower circumference to limit.

The yoke 210 is formed of the soft magnetic substance to provide the magnetic field path, and the bearing holder 220 is forcibly inserted inside the yoke 210. The bearing holder 220 is forcibly inserted inside the magnet 216 having the ring type corresponding to the coils 110 mounted on the bottom of the yoke 210, and the magnet 216 is limited by the bearing holder 220 in the radial direction, and also limited by the yoke 210 in the axial direction.

The counterweight 218 is mounted on an upper side portion of the yoke 210 to generate the eccentricity, and the upper portion of the yoke 210 is extended upward and outward with respect to the shaft 105 to enable the counterweight 218 to be installed in the upper portion of the yoke 210. As shown in FIG. 14, an inner surface of the counterweight 218 disposed toward the shaft 105 corresponds to an outer surface of the bearing holder 220 and an inner surface of an extension of the yoke 210, an upper surface of the counterweight 218 contacts a surface of the extended upper portion of the bearing holder 220, and an outer surface of the counterweight 218 contacts an outer circumference of the yoke 210.

The starter including the coils 110, the motor drive IC120, and the cogging torque generating unit 115 is disposed at a bottom of the rotor 200 and mounted on the printed circuit board 130 on the fixed plate 100. Since the brushless vibration motor shown in FIGS. 14 and 15 is also the mono phase drive type, coils 110, the motor drive IC 120, and the cogging torque generating unit 115 are the sane.

The operation and the structure of the brushless vibration motor shown in FIGS. 14 and 15 are the same as the embodiments shown in FIGS. 4 through 13. Accordingly, detailed description is omitted. Another brushless vibration motor according to another embodiment of the present invention is described here in after in conjunction with FIGS. 16 and 17.

Figure 16:
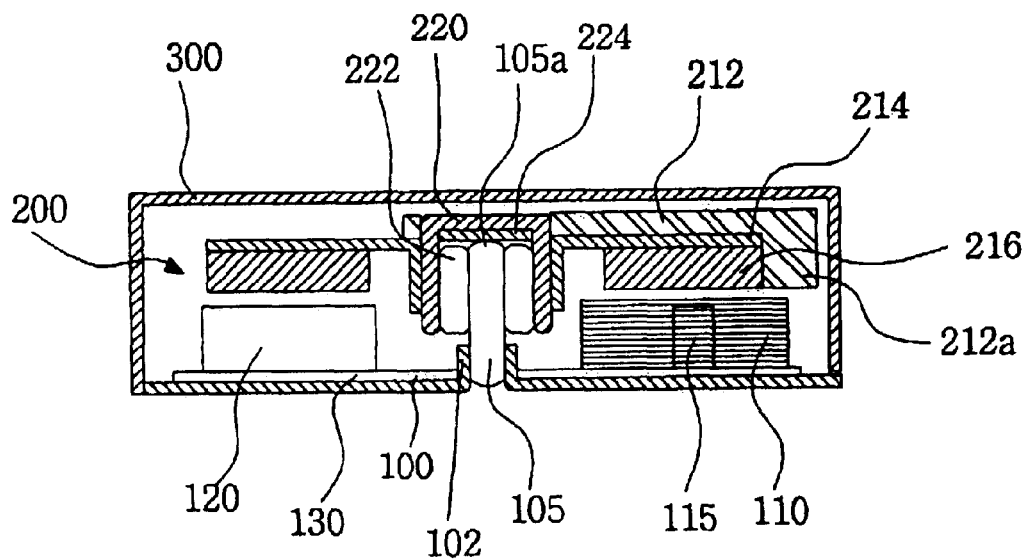
FIG. 16 is a view showing another brushless vibration motor according to another embodiment of the present invention.
Figure 17:
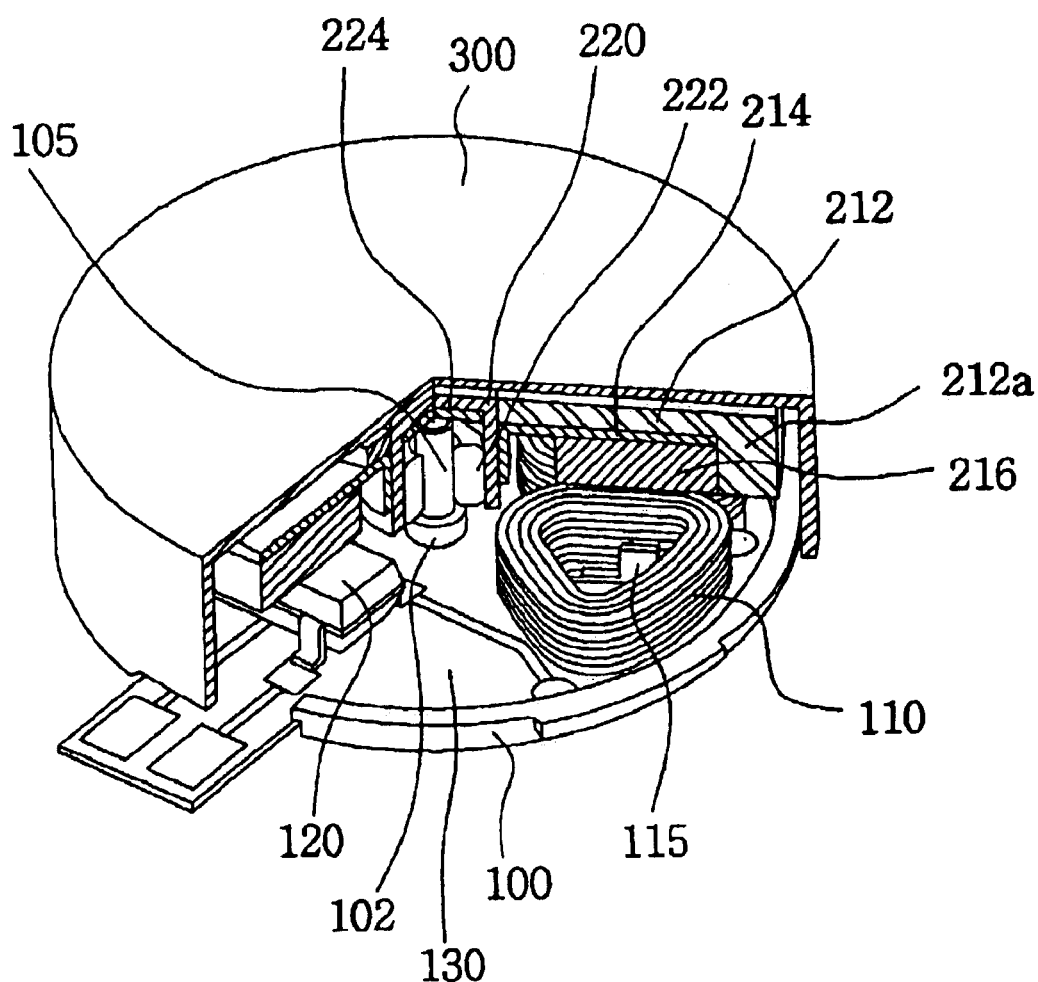
FIG. 17 is a partial perspective view of the brushless vibration motor shown in FIG. 16.

FIG. 16 is a cross-sectional view of the another brushless vibration motor, and FIG. 17 is a partial perspective view of the another brushless vibration motor. As shown in FIGS. 16 and 17, the rotor 200 is disposed to be spaced-apart from the coils 110 and the motor drive IC 120 mounted on the fixed plate 100 by the predetermined distance. The rotor 200 includes the lower yoke 214 having the bearing holder 220 containing the hearing 222 and the magnet 216, the upper yoke 212 as the counterweight 218 to increase the amount of eccentricity, and the thrust washer 224 contacting the shaft 105.

In the assembling structure of the rotor 200, the bearing holder 220, the bearing 222, the shaft 105 forming a rotation axis of the rotor 200 and sliding with respect to the bearing 222, the thrust washer 224 inserted in the bearing holder 220 and supported by the shaft 105 are the same as the embodiments shown in FIGS. 4 through 15. However, a structure of the yoke 210 is different from the embodiments shown in FIGS. 4 through 15.

The yoke 210 includes the upper yoke 212 and the lower yoke 214. The upper yoke 212 is forcibly inserted around an upper portion of the bearing holder 220 and eccentrically disposed around the shaft 105. The upper yoke 212 include a first portion having a first radius and a second portion having a second radius greater than the first radius. The first portion of the upper yoke 212 supports the shaft 105 to rotate the rotor 200, and the second portion of the upper yoke 212 generate the eccentricity and overall shape of the upper yoke 212 is a semi-circular shape. The upper yoke 212 includes an extended end extended downward from an outer circumference of the second portion of the upper yoke 212.

The lower yoke 214 is made of the soft magnetic substance to provide the magnetic field path, and is forcibly inserted around the bearing holder 220 to be fixedly coupled to the bearing holder 220 together with the upper yoke 212. The magnet 216 having the ring type is disposed below the lower yoke 214 to correspond to the coils 110.

The rotor 200 does not include the counterweight 218. Instead, the upper yoke 212 is formed as the counterweight 18 and is an asymmetrical shape to increase the amount of the eccentricity. A manufacturing cost is reduced since the counterweight 18 formed of a tungsten sinter (specific gravity 18) which has the gravity greater than 18 and is expensive, does not have to be separately provided in the rotor 200 of the brushless vibration motor. In addition, the upper yoke 212 is made of a general metal, such as Fe, Cu, or Al, having the specific gravity less than 10. Accordingly, the upper yoke 212 can be formed using a press processing method other than a sinter processing method of forming the tungsten sinter. Therefore, dimension precision of the upper yoke 212 is improved, and the upper yoke 212 can be easily inserted around the bearing holder 220, thereby simplifying a manufacturing process of the rotor 200 of the brushless vibration motor. The dimension precision in assembling the rotor 200 and a run-out (an amplitude of a rotating object in axial and radial directions of the rotating object) of the shaft 105 are improved to increase an overall quality of the brushless vibration motor.

That is, an additional attaching process is required to attach the tungsten sinter to the rotor 200 as the counterweight 218, or the tungsten sinter is forcibly inserted into the rotor 200 using an additional yoke. However, in this embodiment, the upper yoke 212 acts as the counterweight 218 without using the additional attaching process or the additional yoke.

The stator having the coils 110, the motor drive IC 120, and the cogging torque generating unit 115 is disposed below the rotor 200 and arranged on the printed circuit board 130 mounted on the fixed plate 100 like as the embodiments shown in FIGS. 4 through 15. The brushless vibration motor shown in FIGS. 16 and 17 is also the mono phase drive type, the coils 110, the motor drive IC 130, and the cogging torque generating unit 115 are the same as the embodiments shown in the FIGS. 4 through 15.

The operation and the structure of the brushless vibration motor are the same as the embodiments of FIGS. 4 through 15.

According to the aspects of the invention, since the rotor is not formed using a bonding process or a plastic injection molding process but mechanically combined with respective parts, durability and a manufacturing process of the vibration motor are improved, and a manufacturing cost is reduced. Since a rotor structure is improved, a load exerted on a shaft of the rotor decreases, a rotation characteristic of the rotor structure, and a power consumption is reduced.

Since the motor drive IC is disposed on the same plane as the coils to be integrally formed with the coils in the vibration motor, the rotor structure and the motor drive IC are compatible with the vibration motor, and the vibration motor can be minimized.

Since the cogging torque generating unit is mounted in the vibration motor, the non-motive point in which a rotation of the vibration motor is prevented can be removed, and the manufacturing cost can be reduced to change structures of the motor drive IC and the stator according to other phase drive types.

Also, since an assembling structure of the brushless vibration motor becomes simplified compared to a brush type vibration motor, a manufacturing process is simplified, durability is improved, noise is reduced, and a lifespan of the vibration motor increases.

Although a few preferred embodiments of the present invention have been shown and described, it would be appreciated by those skilled in the art that changes may be made in this embodiment without departing from the principle and sprit of the invention, the scope of which is defined in the claims and their equivalent.

What is claimed:

1. A brushless vibration motor comprising:
   a base plate unit having a buffing element extended from the base plate, and including a shaft having a first portion inserted into the burring element to be fixedly coupled to the base plate;
   a stator having one or more coils disposed on the base plate through which current flows;
   a rotor rotatably supported by a second portion of the shaft, and comprises,
   a bearing slidably inserted around the second portion of the shaft,
   a bearing holder having an inside surface forcibly coupled to the bearing, and
   a yoke coupled to the bearing holder and having a magnet mounted on the yoke to be spaced-apart from the coils to generate a rotation electromagnetic force with the coils, and a counterweight generating eccentricity; and
   a cover coupled to the base plate to enclose the stator and the rotor.

2. The motor of claim 1, wherein the bearing holder forms a space with the bearing forcibly inserted into the bearing holder, and the rotor comprises:
   a thrust washer inserted into the space and supported by the second portion of the shaft.

3. The motor of claim 2, wherein the second end of the shaft comprises:
   a distal end formed on the second portion and having a curvature to come into point-contact with the thrust washer to support the thrust washer.

4. The motor of claim 2, wherein the rotor comprises:
   a wall defining the space; and
   a hole formed on the wall through which the space communicate with an outside of the bearing holder.

5. The motor of claim 1, wherein the yoke is formed of a soft magnetic material.

6. The motor of claim 1, wherein:
   the bearing holder comprises,
   a cap shape having an opening open to the base plate,
   another inside surface forming a space with the bearing, and
   a thrust washer inserted into the space and supported by a round end of the second portion of the shaft; and
   the yoke comprises,
   a first yoke forcibly inserted around an outside surface of the bearing holder, and having the counterweight formed on a portion of the upper yoke, and
   a second yoke forcibly inserted around the outside surface of the bearing holder, and having a ring type magnet.

7. The motor of claim 6, wherein the second yoke is formed of a soft magnetic material.

8. The motor of claim 1, wherein:
   the bearing holder comprises,
   a cap shape having an opening open to the base plate,
   another inside surface forming a space with the bearing, and
   a thrust washer inserted into the space and supported by a round end of the second portion of the shaft; and
   the yoke is forcibly inserted around an outside surface of the bearing holder to be fixedly coupled to the bearing holder and comprises,
   a first portion limiting a movement of the counterweight with the bearing holder in axial and radial directions of the shaft, and
   a second portion mounted with the magnet having a ring type.

9. The motor of claim 1, wherein:
   the bearing holder comprises,
   a cap shape having an opening open to the base plate,
   another inside surface forming a space with the bearing, and
   a thrust washer inserted into the space and supported by a round end of the second portion of the shaft; and
   the yoke comprises,
   a first yoke forcibly inserted around an outside surface of the bearing holder and formed asymmetrically with respect to the shaft to eccentrically rotate the rotor, and
   a second yoke forcibly inserted around the outside surface of the bearing holder and formed with the magnet having a ring type.

10. The motor of claim 9, wherein the second yoke is formed of a soft magnetic material.

11. The motor of claim 9, wherein the first yoke is formed of a metal having a specific gravity of less than 10.

12. The motor of claim 1, wherein the bearing holder comprises a cap shape having an opening open to the base plate, the yoke is coupled to an upper surface of the bearing holder, the magnet is a ring-type disposed on the yoke, and the counterweight is disposed on the yoke.

13. The motor of claim 12, wherein the yoke forms a space with the bearing holder, and the rotor comprises:
   a hole formed on a portion of the bearing holder to communicate with the space and an outside of the bearing holder; and
   a thrust washer having one portion inserted into the hole and the other portion disposed in the space between the portion of the bearing holder and the shaft to be supported by a curved end of the second portion of the shaft.

14. The motor of claim 12, wherein:
   the yoke comprises,
   a circumference bent toward the base plate;
   the magnet comprises,
   an inner surface supported by an outer surface of the bearing holder and disposed on the yoke; and
   the counterweight comprises,
   a protrusion having a step shape in an radial direction of the shaft and disposed between an outer circumferential surface of the magnet and an inside surface of the circumference of the yoke.

15. The motor of claim 13, wherein the rotor comprises:
   an air circulation hole formed on one of the bearing holder and the thrust washer and communicating with a space surrounded by the bearing, the thrust washer, and the shaft.

16. The motor of claim 1, wherein the motor is a mono phase drive type having a non-motive point, and the rotor comprises:
   a cogging torque generating unit disposed on one of the base plate and the cover to prevent the non-motive point.

17. The motor of claim 16, wherein the magnet comprises a plurality of magnetic poles having a first angle with respect to the shaft, the coil comprises a center line extended from the shaft, and the cogging torque generating unit is disposed on a line forming a second angle of a quarter of the first angle of one of the coils with respect to the center line of the one coil.

18. The motor of claim 17, wherein the magnet comprises 6 magnetic poles, the one coil comprises a center line extended from the shaft, and the cogging torque generating unit is disposed on a line having an angle of 15 degrees with respect to the center line of the one coil.

19. The motor of claim 17, wherein:
the magnet comprises,
6 magnetic poles,
the coils comprise sub-coils each having a center line extended from the shaft; and
the cogging torque generating unit comprises,
sub-cogging torque generating units each disposed on a line having an angle of 15 degrees with respect to corresponding center line of the sub-coils.

20. A brushless vibration motor comprising:
a base plate unit having a burring element extended from the base plate, and including a shaft having a first portion inserted into the burring element to be fixedly coupled to the base plate;
a stator having at least one coil disposed on a first area of the base plate through which current flows;
a rotor rotatably supported by a second portion of the shaft, and comprises,
a bearing slidably inserted around the second portion of the shaft,
a bearing holder having an inside surface forcibly coupled to the bearing, and
a yoke coupled to the bearing holder and having a magnet mounted on the yoke to be spaced-apart from the coil to generate a rotation electromagnetic force with the coil, and a counterweight generating eccentricity;
a motor drive IC disposed on a second area of the base plate to face the rotor and to control the current flowing through the coil; and
a cover coupled to the base plate to enclose the stator, the rotor, and the motor drive IC.

21. The motor of claim 20, wherein the stator comprises:
a hall element formed in the motor drive IC in a single body to detect polarity of the magnet.

22. The motor of claim 20, wherein:
the base plate comprises,
a first side facing the rotor and a second side disposed opposite to the first side; and
the stator comprises,
a printed circuit board disposed on the first side of the base plate and mounted with the coil and the motor drive IC.

23. The motor of claim 22, wherein the base plate comprises:
a terminal unit formed on one of the first and second sides of the base plate, coupled to the printed circuit board, and coupled to an external source to receive the current.

24. The motor of claim 22, wherein the stator comprises:
another printed circuit board disposed on one of the first and second sides of the base plate, coupled to an external source to receive the current, and coupled to the printed circuit board having the coil and the motor drive IC.

25. The motor of claim 20, wherein the base plate comprises:
one of a single printed circuit board and a double-sided printed circuit board.

26. The motor of claim 20, wherein the bearing holder forms a space with the bearing forcibly inserted into the bearing holder, and the rotor comprises:
a thrust washer inserted into the space and supported by the second portion of the shaft.

27. The motor of claim 26, wherein the second end of the shaft comprises:
a distal end formed on the second portion and having a curvature to come into point-contact with the thrust washer to support the thrust washer.

28. The motor of claim 26, wherein the rotor comprises:
a wall defining the space; and
a hole formed on the wall through which the space communicate with an outside of the bearing holder.

29. The motor of claim 20, wherein the yoke is formed of a soft magnetic material.

30. The motor of claim 20, wherein:
the bearing holder comprises,
a cap shape having an opening open to the base plate,
another inside surface forming a space with the bearing, and
a thrust washer inserted into the space and supported by a round end of the second portion of the shaft; and
the yoke comprises,
a first yoke forcibly inserted around an outside surface of the bearing holder, and having the counterweight formed on a portion of the upper yoke, and
a second yoke forcibly inserted around the outside surface of the bearing holder, and having a ring type magnet.

31. The motor of claim 30, wherein the second yoke is formed of a soft magnetic material.

32. The motor of claim 20, wherein:
the bearing holder comprises,
a cap shape having an opening open to the base plate,
another inside surface forming a space with the bearing, and
a thrust washer inserted into the space and supported by a round end of the second portion of the shaft; and
the yoke is forcibly inserted around an outside surface of the bearing holder to be fixedly coupled to the bearing holder and comprises,
a first portion limiting a movement of the counterweight with the bearing holder in an axial direction and in a radial direction of the shaft, and
a second portion mounted with the magnet having a ring type.

33. The motor of claim 20, wherein:
the bearing holder comprises,
a cap shape having an opening open to the base plate,
another inside surface forming a space with the bearing, and
a thrust washer inserted into the space and supported by a round end of the second portion of the shaft; and
the yoke comprises,
a first yoke forcibly inserted around an outside surface of the bearing holder and formed asymmetrically with respect to the shaft to eccentrically rotate the rotor, and a second yoke forcibly inserted around the outside surface of the bearing holder and formed with the magnet having a ring type.

34. The motor of claim 33, wherein the second yoke is formed of a soft magnetic material.

35. The motor of claim 33, wherein the first yoke is formed of a metal having a specific gravity of less than 10.

36. The motor of claim 20, wherein the bearing holder comprises a cap shape having an opening open to the base plate, the yoke is coupled to an upper surface of the bearing holder, the magnet is a ring-type disposed on the yoke, and the counterweight is disposed on the yoke.

37. The motor of claim 36, wherein the yoke forms a space with the bearing holder, and the rotor comprises:
- a hole formed on a portion of the bearing holder to communicate with the space and an outside of the bearing holder; and
- a thrust washer having one portion inserted into the hole and the other portion disposed in the space between the portion of the bearing holder and the shaft to be supported by a curved end of the second portion of the shaft.

38. The motor of claim 36, wherein:

the yoke comprises, a circumference bent toward the base plate;

the magnet comprises,
- an inner surface supported by an outer surface of the bearing holder and disposed on the yoke; and the counterweight comprises,
- a protrusion having a step shape in an radial direction of the shaft and disposed between an outer circumferential surface of the magnet and an inside surface of the circumference of the yoke.

39. The motor of claim 37, wherein the rotor comprises:

an air circulation hole formed on one of the bearing holder and the thrust washer and communicating with a space surrounded by the bearing, the thrust washer, and the shaft.

40. The motor of claim 20, wherein the motor is a mono phase drive type having a non-motive point, and the rotor comprises:
- a cogging torque generating unit disposed on one of the base plate and the cover to prevent the non-motive point.

41. The motor of claim 40, wherein the magnet comprises a plurality of magnetic poles having a first angle with respect to the shaft, the coil comprises a center line extended from the shaft, and the cogging torque generating unit is disposed on a line forming a second angle of a quarter of the first angle of the coil with respect to the center line of the coil.

42. The motor of claim 41, wherein the magnet comprises 6 magnetic poles, the coil comprises a center line extended from the shaft, and the cogging torque generating unit is disposed on a line having an angle of 15 degrees with respect to the center line of the coil.

43. The motor of claim 41, wherein:

the magnet comprises, 6 magnetic poles, the coil comprises sub-coils each having a center line extended from the shaft; and the cogging torque generating unit comprises, sub-cogging torque generating units each disposed on a line having an angle of 15 degrees with respect to corresponding center line of the sub-coils.

* * * * *